United States Patent [19]

Watanabe et al.

[11] 4,449,192
[45] May 15, 1984

[54] RADIO WAVE ANGLE OF INCIDENCE MEASUREMENT APPARATUS

[76] Inventors: Masaru Watanabe; Nobuharu Yamauchi; Naoki Hashimoto; Tetsuo Tamama, all of c/o Communications Equip. Works of Mitsubishi Denki K.K. No. 80, Nakano, Minami Shimizu, Amagasaki City, Hyogo Prefecture, Japan

[21] Appl. No.: 329,030

[22] Filed: Dec. 9, 1981

Related U.S. Application Data

[63] Continuation-in-part of Ser. No. 24,667, Mar. 28, 1979, abandoned, which is a continuation of Ser. No. 476,157, Jun. 3, 1974, abandoned, which is a continuation-in-part of Ser. No. 859,911, Sep. 22, 1969, abandoned.

[30] Foreign Application Priority Data

Sep. 5, 1968 [JP] Japan .................................. 43-63942

[51] Int. Cl.³ .......................... G06F 15/20; G01S 3/46; G01S 3/48
[52] U.S. Cl. .................................. 364/559; 343/417; 343/446; 364/514
[58] Field of Search ..................... 343/113 R; 364/514, 364/559

[56] References Cited

U.S. PATENT DOCUMENTS

| | | | |
|---|---|---|---|
| 3,686,670 | 8/1972 | Callendar et al. | 343/113 R |
| 3,727,227 | 4/1973 | Takao et al. | 343/113 R X |
| 3,728,730 | 4/1973 | Takao et al. | 343/113 R |
| 3,787,863 | 1/1974 | Watanabe et al. | 343/113 R |
| 3,816,834 | 6/1974 | Wilson | 343/113 R |
| 3,887,923 | 6/1975 | Hendrix | 343/113 R |
| 3,946,395 | 3/1976 | Kirchhoff | 343/113 R |
| 3,947,805 | 3/1976 | Faugeras et al. | 343/113 R X |
| 4,057,803 | 11/1977 | Coleman | 343/113 R |
| 4,170,774 | 10/1979 | Schaefer | 343/113 R X |
| 4,227,196 | 10/1980 | Langeraar | 343/113 R X |

FOREIGN PATENT DOCUMENTS 1948162 4/1971 Fed. Rep. of Germany ... 343/113 R

Primary Examiner—Felix D. Gruber
Attorney, Agent, or Firm—Robert E. Burns; Emmanuel J. Lobato; Bruce L. Adams

[57] ABSTRACT

This invention relates to a radio wave angle of incidence measurement apparatus which is applicable to radar and other detection systems, and which utilizes an antenna array with radiator elements distributed at a spacing larger than one half of the propagation wavelength. A radio signal is received by an antenna array that exhibit at least two different values of d/λ (where d is the inter-element spacing of the radiator elements, λ the propagation wavelength), and the resultant inter-element phase differences, of which there are at least two sets, are digitally measured. A phase difference converter circuit receives the digital signals representing the inter-element phase differences and processes them and generates an output signal that varies monotonically as the incident angle of the radio signal incident on the antenna array varies.

8 Claims, 30 Drawing Figures

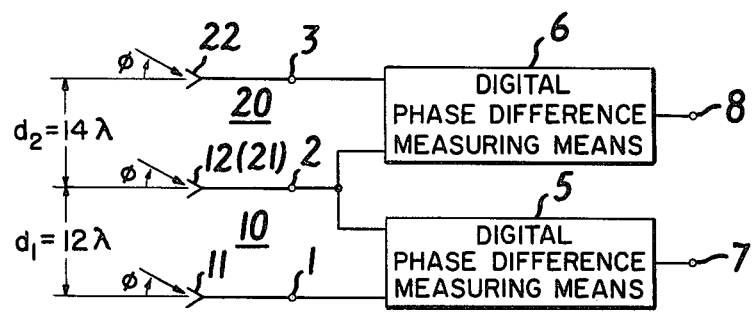
FIG. 1
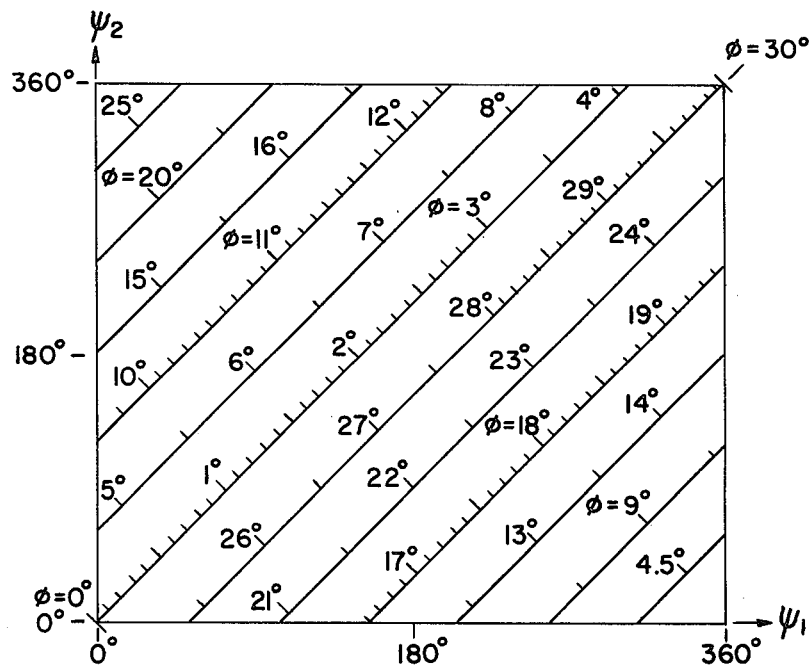
FIG. 2
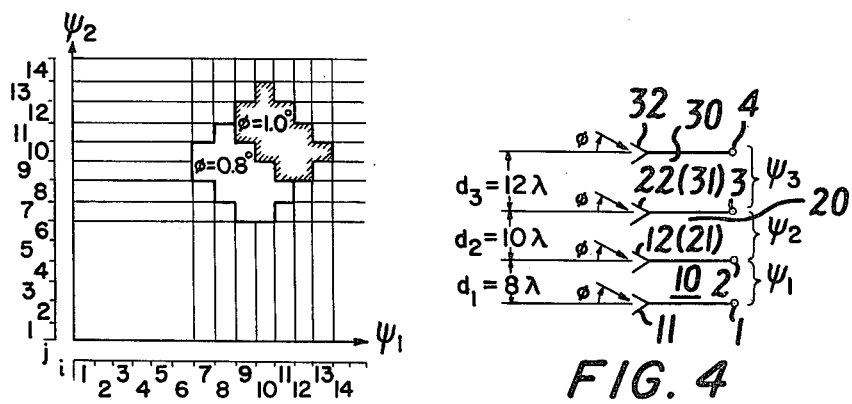
FIG. 3
FIG. 4

```
            1011010
    x)      1000101
            1011010
          1011010  ←
    +) 1011010  ← ← ←
       1100001000010
```

← : shift by one bit

An Example of Binary Multiplication if(UA)≧0,Go to 108

43 45 47 49 51 53 55 57 59 61 63 65 67 69 71 73 75 77 79 81 83 85 87 89 91 93 95 97
42 44 46 48 50 52 54 56 58 60 62 64 66 68 70 72 74 76 78 80 82 84 86 88 90 92 94 96 if(UA)LSB=1
132 134 136 138 140 142 144 146
133 135 137 139 141 143 145 Go to 146

Timing and Waveforms of Control Signals

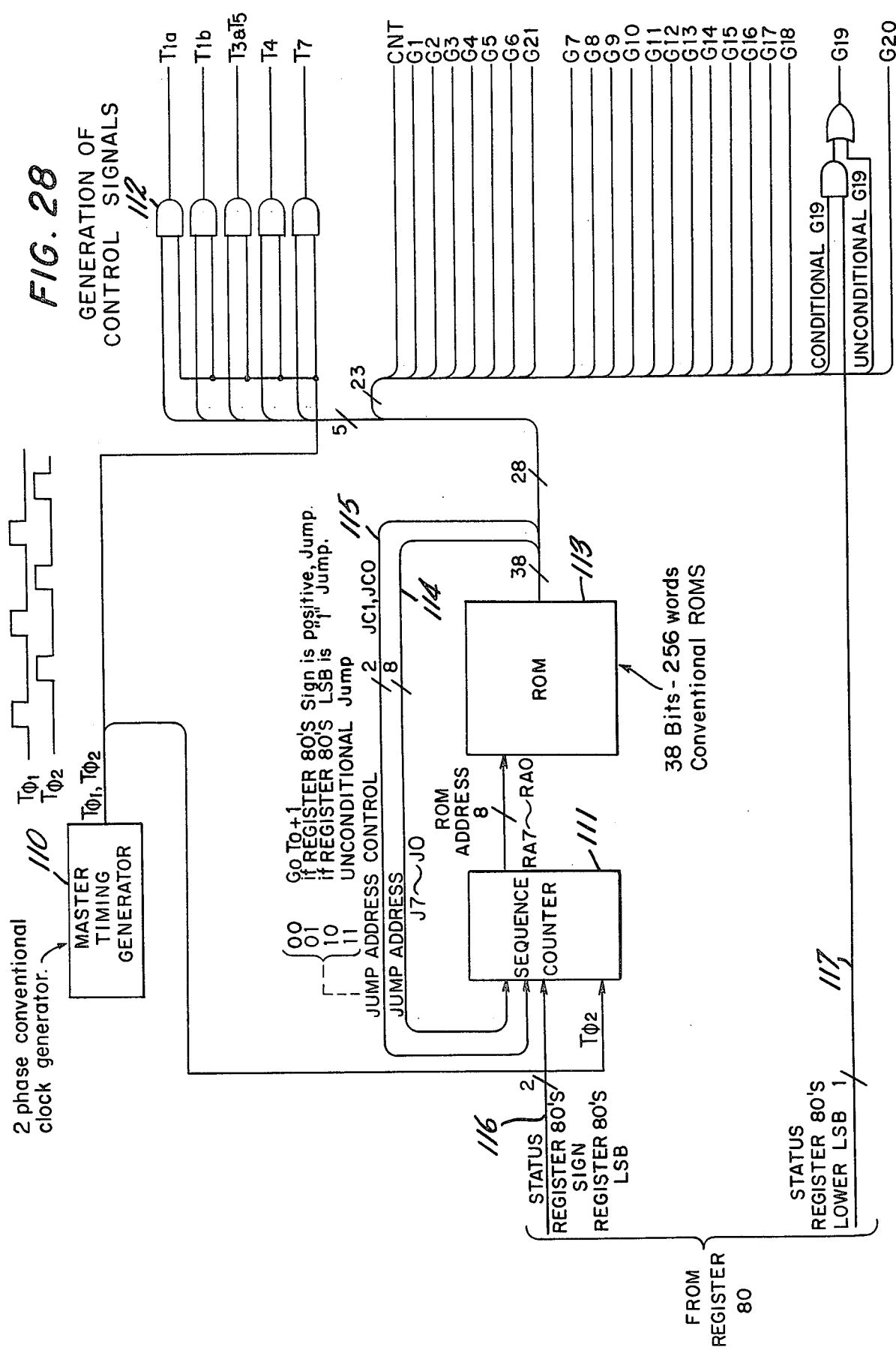

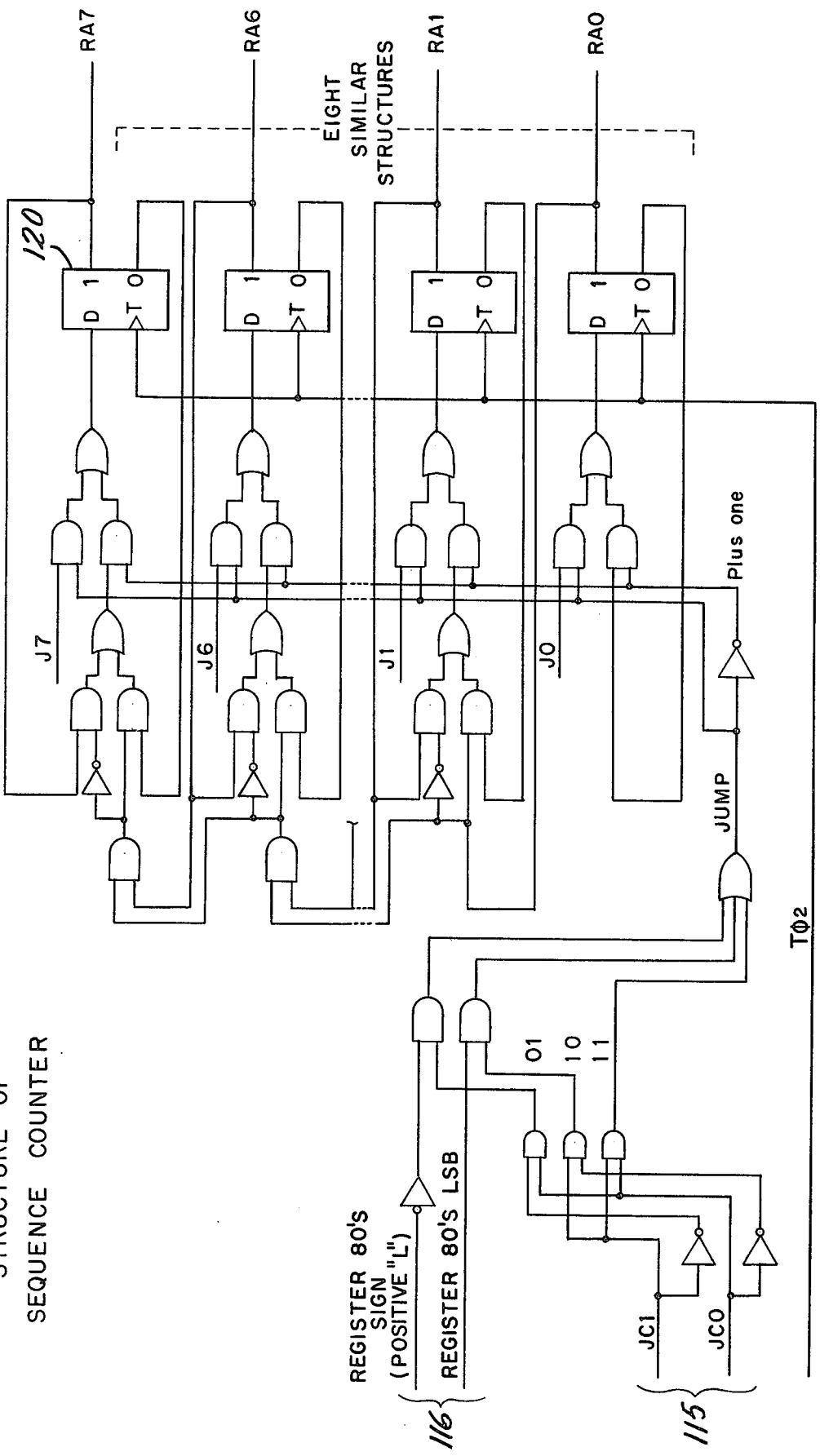
FIG. 29 STRUCTURE OF SEQUENCE COUNTER

RADIO WAVE ANGLE OF INCIDENCE MEASUREMENT APPARATUS

RELATED APPLICATIONS

This is a continuation-in-part application of our application Ser. No. 24,667 filed Mar. 28, 1979, now abandoned, which was a continuation of our application Ser. No. 476,157 filed June 3, 1974, now abandoned, which was a continuation-in-part of our application Ser. No. 859,911 filed Sept. 22, 1969 and now abandoned.

BACKGROUND OF THE INVENTION

1. Field of the Invention

This invention relates to a radio angle measurement apparatus which is applicable to radar and other electromagnetic detection systems and which utilizes antenna array system(s) with radiator elements distributed at a spacing larger than one half of the propagation wavelength, and which measures the incident angle of a signal by measuring phase differences between the signals that are received by neighboring elements of the antenna array.

2. Description of the Prior Art

The present applicants are the inventors of the "Radio Angle Measurement Apparatus" disclosed in U.S. Pat. No. 3,787,863. That patent includes a survey of the prior art, and discloses an improved radio angle measurement apparatus with the following features:

(1) The inter-element spacings of the antenna arrays are considerably larger than one half of the propagation wavelength, thus allowing for larger gain and more elaborate characteristics of the radiator elements, as well as permitting a higher angular accuracy due to the fact that a small incident angle produces a large phase difference for a large spacing.

(2) The unambiguous sector is large.

(3) At least two different values of d/λ (where d is the inter-element spacing, λ the propagation wavelength) are used with the antenna array, while the total number of radiator elements is small; high angular accuracy is achieved with a total of three or four radiator elements, the minimum possible number being two.

(4) Detection of multiple directions is possible and data rate is high; spatial scanning of the antenna beam is eliminated.

(5) Consideration is paid to the process of correlating the measured sets of inter-element phase differences to the incident angle of the received signal, and particularly to the role played by the resolution of phase discrimination, with the result that it is possible to construct optional embodiments to maximize the possibility of accurate angle measurement.

(6) The degree of freedom is large in selecting the ratio of d/λ values of antenna arrays, and it is possible to independently select optimal spacing and optimal resolution of phase measurement for every application.

Briefly, the above features of the structure disclosed in U.S. Pat. No. 3,787,863 have been accomplished in the following manner:

(1) A radio signal of incident angle $\phi$ is received by antenna arrays that exhibit at least two different values of d/λ (where d is the inter-element spacing of the radiator elements, λ the propagation wavelength); the resultant inter-element phase differences, of which there are at least two sets, $\Psi_1$, $\Psi_2$, etc., in accordance with the difference in d/λ values, are measured.

(2) The incident angle of the received signal is obtained by a phase-difference-to-angle correlating means which correlates all or a part of the measured sets of said phase differences to the incident angle of the signal, making use of previously memorized angle values derived from either theoretically or experimentally known relationships therebetween.

(3) The domain of the sets of $\Psi_1$, $\Psi_2$, etc., to be correlated to a certain value of incident angle (hereinafter referred to as a "phase domain") does not necessarily represent a rectangular or cubic rectangular shape within the ($\Psi_1$, $\Psi_2$, . . .) space as expressed by $\alpha \leq \Psi_1 \leq \beta$, $\gamma \leq \Psi_2 \leq \delta$, etc. (where $\alpha$, $\beta$, $\gamma$ and $\delta$ are constants.), but may be made to represent, as a sum of rectangular or cubic rectangular shapes, such a polygonal or polyhedral shape as to fit the shape of error distribution of ($\Psi_1$, $\Psi_2$, . . .). By shaping the phase domain in this manner, the possibility of accurate angle measurement is increased.

The invention disclosed in U.S. Pat. No. 3,787,863 which is otherwise very useful in the construction of radio angle measurement apparatus, nevertheless has disadvantages in that the phase-difference-to-angle correlating means is required to memorize the incident angle values that correspond to a considerable number of sets of ($\Psi_1$, $\Psi_2$, . . . etc.), thereby resulting in complicated structure of the correlating means.

It is therefore an object of the present invention, while preserving the advantages of the patented radio angle measurement apparatus, to provide radio angle measurement apparatus in which the conversion from the measured phase difference values to the incident angle is performed easier and with less complex apparatus than in the patented apparatus.

More particularly, it is an object of the present invention to provide a radio angle measurement apparatus in which signals representing measured values of inter-element phase differences are electronically processed to generate a new signal representative of the received signal incident angle without requiring a correlation operation and the attendant high capacity memory.

It is another object of the present invention to provide a radio angle measurement apparatus in which the output signal representative of the received signal incident angle varies monotonically with the incident angle.

It is still another object of the present invention to provide a radio angle measurement system in which the signal representative of the received signal incident angle is a series of consecutive numbers in binary, trinary, decimal or other numbering system whose cardinal number can be freely selected.

SUMMARY OF THE INVENTION

According to the present invention a received radio frequency electromagnetic signal is received by an antenna array that exhibits at least two different values of d/λ where d is the inter-element spacing of the radiator elements, λ the propagation wavelength) and the received radio signal is incident on the antenna array at an angle $\phi$, and the resultant inter-element phase differences, of which there are at least two sets, $\Psi_1$, $\Psi_2$, etc. in accordance with the difference in d/λ values, are digitally measured. The ratio d/λ is obtained by employing two or more values of inter-element spacing d1, d2, and one common propagation value λ, or by employing one common value of inter-element spacing d and two propagation wavelengths $\lambda_1$, $\lambda_2$.

Phase difference converter means receives the digital signals representative of the inter-element phase differences and processes the digital phase difference signals for generating an output signal representative of the incident angle of the received radio-frequency electromagnetic signal and which varies monotonically as the incident angle varies. The phase difference converter means is comprised of a binary adder circuit for performing addition, subtraction and multiplication operations on binary signals applied to the binary adder circuit, storage means for temporarily storing the digital phase difference signals and for temporarily storing in binary signal format binary signals from the binary adder circuit. Memory means stores numerical constants used for signal processing of the phase difference signals, and selecting means selects among the temporarily stored phase difference signals, the adder circuit output signal and the output of the memory means and applies the selected signals to the adder circuit to permit addition, subtraction and multiplication operations to be preformed on the signals. Control means applies control signals to the storage means, the binary adder circuit, the selection means and the memory means to control the phase difference converter means to generate an output signal which varies monotonically as the incident angle of the received radio-frequency electromagntic signal varies.

According to a preferred embodiment of the invention, the output signal of the phase difference converter means is a digital signal having values forming a series of consecutive numbers in a number system with any desired cardinal number and which vary monotonically with the incident angle of the received radio-frequency electromagnetic signal.

DESCRIPTION OF THE DRAWINGS

These and other advantages of the present invention will be more apparent when considered in reference to the following descriptions and drawings, throughout which drawings like characters indicate like parts, and of which:

FIG. 1 is a diagram in schematic form of an example of antenna arrays and phase difference measuring means that constitute a part of an embodiment of the present invention;

FIG. 2 is a graphic diagram showing the functional relationship between the signal incident angle and inter-element phase differences in relation to the example of FIG. 1;

FIG. 3 is a descriptive graphic diagram showing the function of the devices of FIG. 1;

FIG. 4 is a diagram of another example of antenna arrays that constitute a part of an embodiment of the present invention;

FIG. 28 is a schematic block diagram of the control circuit for generating the control signals of the phase difference converter illustrated in FIG. 18; and FIG. 29 is a schematic circuit diagram of the sequence counter circuit of the control circuit illustrated in FIG. 28.

DESCRIPTION OF PREFERRED EMBODIMENT

Figure 5:
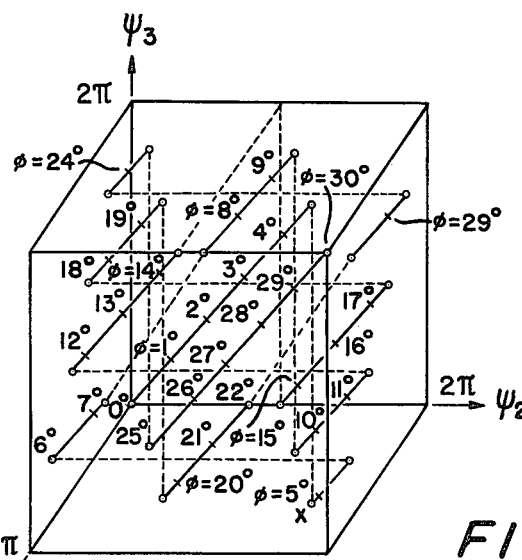
FIG. 5 is a graphic diagram showing the functional relationship between the signal incident angle and phase difference in relation to the antenna arrays of FIG. 4.

Referring now to the drawings for a more detailed understanding of the invention, and in particular, to FIG. 1 thereof, there is shown an example of antenna array and phase difference measuring means that constitute a part of the invention, in which 10 is the first antenna array comprising radiator elements 11, 12 distributed at an inter-element spacing $$d_1 = 12\lambda, \qquad (1)$$

where $\lambda$ is the propagation wavelength, and 20 is the second antenna array comprising radiator elements 21, 22 distributed at an inter-element spacing $$d_2 = 14\lambda \qquad (2)$$

The figure shows the case where one of the radiator elements designated 12(21) is used commonly by two arrays thus making the total number of radiator elements three. The outputs from the radiator elements 11, 12(21) and 22 are observed at the output terminals respectively. Assuming that there is a radio signal coming from a direction so as to be received at an incident angle $\phi$ measured from the array broadside, then there will appear, as has previously been explained, phase differences $\Psi_1$, $\Psi_2$ between the signals observed at the output terminals 1, 2 and 3, which are expressed as:

$$\Psi_1 = (2\pi/\lambda) d_1 \sin \phi \tag{3}$$

$$\Psi_2 = (2\pi/\lambda) d_2 \sin \phi, \tag{4}$$

and the incident angle $\phi$ is expressed as a function of two phase variables ($\Psi_1$, $\Psi_2$). By eliminating sin $\Psi$ from equations (3) and (4), we have $$\Psi_1/d_1 = \Psi_2/d_2 \tag{5}$$

which defines a locus of values of ($\Psi_1$, $\Psi_2$) corresponding to the variation of the incident angle, which is hereinafter to be referred to as the "phase locus". The phase locus is, therefore, the set of phase difference values ($\Psi_1$, $\Psi_2$) that occur as the incident angle $\Psi$ varies over all possible values. By substituting equations (1) and (2) into (3), (4) and (5), we have $$\Psi_1 = 12 \times 360° \sin \phi \tag{6}$$

$$\Psi_2 = 14 \times 360° \sin \phi \tag{7}$$

$$\Psi_1/6 = \Psi_2/7. \tag{8}$$

Plotting the phase locus graphically, with consideration to the fact that the phase difference values ($\Psi_1$, $\Psi_2$) recur every 360 degrees, we obtain FIG. 2, in which the corresponding values of $\phi$ are shown on scale at different points along the values of $\phi$ are shown on scale at different points along the phase locus. It can be seen from FIG. 2 that unambiguous determination of the incident angle $\phi$ is possible over a sector of 0 to 30 degrees as a function of the two phase difference values ($\Psi_1$, $\Psi_2$).

Assume that there is a radio signal coming into the devices of FIG. 1 from the direction of incident angle $\phi = 1.0$ degree. Then the phase differences $\Psi_1$ and $\Psi_2$, observed between the terminal pairs 1 and 2, and 2 and 3 respectively, are, by putting $\phi = 1.0$ degree in equations (6) and (7), $$\begin{aligned} \Psi_1 &= 12 \times 360° \times \sin 1° = 75.4° \\ \Psi_2 &= 14 \times 360° \times \sin 1° = 88.0° \end{aligned} \tag{9}$$

The digital phase difference measuring means 5 and 6 so function as to measure $\Psi_1$ and $\Psi_2$ with resolutions of 360/49 and 360/42 degrees repectively; in other words, the phase difference measuring means 5 produces a digital signal representing the value i in the following equation:

$$\frac{i-1}{49} 360° \leq \Psi_1 < \frac{i}{49} 360° \tag{10}$$

and likewise the phase difference measuring means 6 produces a digital signal representing the value j in the following equation:

$$\frac{j-1}{42} 360° \leq \Psi_2 < \frac{j}{42} 360° \tag{11}$$

where i=1, 2, . . ., 49, J=1,2, . . ., 42.

Details of the structure of such phase difference measuring means have been given in detail in the aforementioned U.S. Pat. No. 3,787,863. By putting equation (9) into (10) and (11), we have, for the present example $$(i, j) = (11, 11). \tag{12}$$

In order to obtain the incident angle value, it is necessary to transform the measured set of (i, j) values to an incident angle value. Allowing for measurement errors that are bound to be present in actual application, the signal transformation process should be performed in such a manner that, not only the set of equation (12), but, for instance, a total of 14 sets of (i, j) values graphically shown in FIG. 3 are transformed to the incident angle value of 1.0 degree; likewise other 14 sets of (i, j) values as also shown in FIG. 3 are to be transformed to the incident angle value of 0.8 degree. Other sets of (i, j) values are to be transformed to other incident angle values in a similar manner. This transformation process has also been described in detail in U.S. Pat. No. 3,787,863 which discloses that it can be a correlation process wherein the measured values (i, j) are correlated with a corresponding previously memorized value of $\phi$.

In FIG. 4 there is shown another example of antenna arrays that may be used in the present invention; it differs from that of FIG. 1 in that three different values of d/$\lambda$ are employed. Consequently the phase locus appears, as seen in FIG. 5, in a three-dimensional space ($\Psi_1$, $\Psi_2$, $\Psi_3$) instead of a two-dimensional plane ($\Psi_1$, $\Psi_2$). It is apparent that the spirit of the invention can be applied to such cases without difficulty.

The above process of phase difference to incident angle conversion by the prior art correlation technique requires the correlating means to memorize the incident angle values that correspond to a considerable number of sets of (i, j), thereby tending to complicate the structure of the correlating means. This is a consequence of the fact that the phase locus of equation (8) and FIG. 2 is parallel to neither the $\Psi_1$ nor $\Psi_2$ axes; the domain of the ($\Psi_1$, $\Psi_2$) plane to be correlated to various values of incident angle, as the incident angle varies continuously, must be repeatedly displaced in the direction of the phase locus as shown in the example of FIG. 3, thereby resulting in an irregular shape of the phase domains.

It is noted here in passing that the incident radio signal may either be a radio wave emanating from an object or a radio echo of a transmitted wave reflected from an object and which originated from a transmitter and a transmitting radiator; in the latter case, the transmitter and the transmitting radiator may either be separately installed, or incorporated into the present invention, making the radiators illustrated in FIG. 1 or 4 serve the dual purposes of transmission and reception. Since any of above modifications do not present an obstacle to the application of the invention, the description hereafter will concern itself with the case where a radio signal is received by the invention, without particular regard to the origin of the incident signal.

Figure 6:
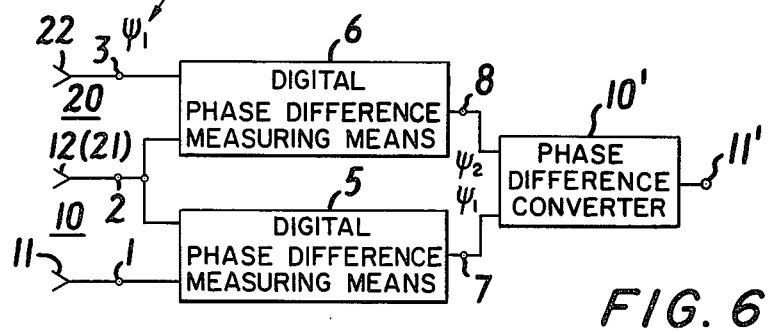
FIG. 6 is a diagram in schematic form of an example of a radio angle measurement apparatus in accordance with the present invention.

Referring now to FIG. 6, there is shown an embodiment of the present invention in which 10' designates phase difference to incident angle converter means with output terminal 11'. In FIG. 6 elements the same as those illustrated in FIG. 1 are designated by the same reference numerals. Other like characters indicate like parts as in FIG. 1. The function of the converter 10' will be the chief object of the following descriptions, with occasional reference to the phase difference measuring means whose structure has been described in detail in the aforementioned U.S. Pat. No. 3,787,863.

The phase difference to incident angle converter 10' performs signal processing operations that can be described mathematically as coordinate transformations (rotational and translational) and affixing of angle sequence numbers. As has been seen in FIG. 3, it is desirable that the "phase domains" that correspond to certain values of incident angle are aligned along and around the phase locus; consequently the shapes of phase domains generally resemble that of a parallelogram having a pair of sides parallel to the phase locus and another pair parallel to a directionn forming a certain angle $\beta$ therewith, as shown in FIG. 7, where the angle $\alpha$ between the $\Psi_1$ axis and the phase locus, as is derived from equation (5), is given by $$\alpha = \tan^{-1}(d_2/d_1). \qquad (13)$$

While the boundary of the phase domain usually exhibits step-like shapes as in FIG. 3 due to the effect of measurement quantization, the following description will concern the most complicated case where the measurement resolution is infinite; a similar description is applicable to other actual cases. As has been described, each phase domain consists of many sets of measured $(\Psi_1, \Psi_2)$ values with the result that in the prior art techniques each of the sets has to be separately detected to accomplish the correlation to incident angle value. According to the present invention the phase difference signals representing the phase difference values are transformed by a signal processing operation directly into a signal having a value which is a direct measure of the value of the incident angle $\phi$, without utilizing the point by point correlation of the measured values of phase difference with memorized values of incident angle. Moreover, it is possible to generate the signal representative of incident angle so as to have values equal to a series of "angle sequence numbers" which is a direct measure of the incident angle. The structure of the converter is consequently greatly simplified by avoiding the necessity for memorizing incident angle values that correspond to a considerable number of sets of $(\Psi_1, \Psi_2)$ values.

Figure 7:
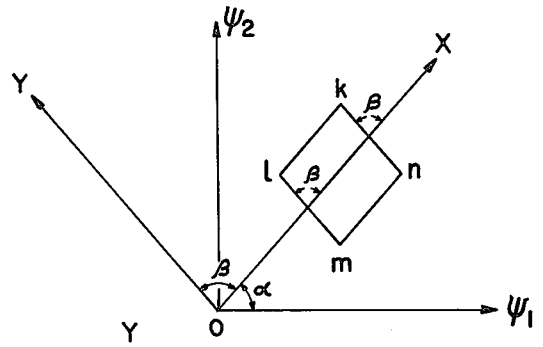
FIGS. 7 and 8 are conceptual graphic diagrams showing the principle of operation of radio angle measurement apparatus in accordance with the present invention.

In FIG. 7 is shown a rectangle klmn which is an example of a phase domain corresponding to a value of incident angle, and a set of new coordinates (X, Y). A common origin is shared by both the $(\Psi_1, \Psi_2)$ and (X, Y) coordinates; the direction of the X axis coincides with that of the phase locus, and that of Y axis forms an angle $\beta$ therewith. These directions are so chosen as to make X//kl//mn and Y//kn//lm. The relationship between the two coordinate systems is given by $$Y = \frac{\Psi_2 \cos \alpha - \Psi_1 \sin \alpha}{\sin \beta} \qquad (14)$$

$$X = \frac{-\Psi_2 \cos(\alpha + \beta) + \Psi_1 \sin(\alpha + \beta)}{\sin \beta}. \qquad (15)$$

Denoting the points k, l, m and n in $(\Psi_1, \Psi_2)$ coordinates by $(\Psi_{1k}, \Psi_{2k})$, $(\Psi_{1l}, \Psi_{2l})$, $(\Psi_{1m}, \Psi_{2m})$ and $(\Psi_{1n}, \Psi_{2n})$, the values $\Psi_{1k}$, $\Psi_{1l}$, $\Psi_{1m}$, and $\Psi_{1n}$ are all different from each other and so are the values $\Psi_{2k}$, $\Psi_{2l}$, $\Psi_{2m}$ and $\Psi_{2n}$. When these points, however, are designated in (X,Y) coordinates by $(X_k, Y_k)$, $(X_l, Y_l)$, $(X_m, Y_m)$ and $(X_n, Y_n)$, then equations $X_k = X_n$, $X_l = X_m$, $Y_k = Y_l$ and $Y_m = Y_n$ hold, so that the phase domain determind by the points k, l, m and n is simply expressed by two separated variables:

$$X_l \leq X \leq X_k, \quad Y_m \leq Y \leq Y_k \qquad (16)$$

In order to examine, then, to which of the phase domains a set of phase difference values $(\Psi_1, \Psi_2)$ belongs, it is sufficient to transform those values into corresponding values in the (X, Y) coordinate system according to equations (14) and (15) and then to perform the comparison of equation (16). This is a much simplified process in comparison to the former process of FIG. 3 in that, first, the criterion of comparison, equation (16), has separated variables, and second, the number of phase domains determined by equation (16) is considerably smaller than the number of all the sets of $(\Psi_1, \Psi_2)$.

Figure 8:
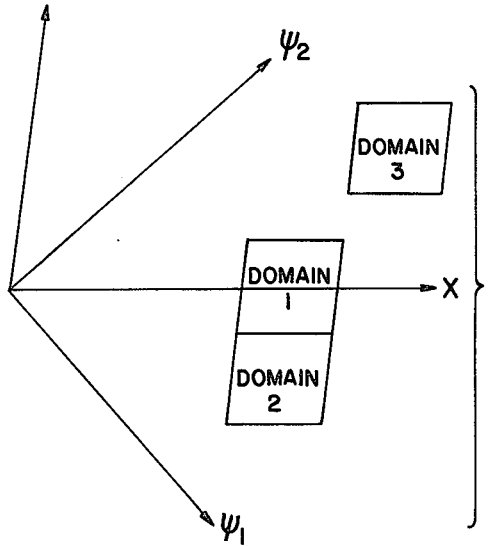

FIG. 8 is the diagram in which the coordinate system of FIG. 7 have been rotated clockwise by an angle $\alpha$, in which there are shown three examples of phase domains corresponding to certain values of incident angle and designated Domains 1, 2 and 3. Since all these domains have sides parallel to either the X or Y axis, dtermination of the incident angle value corresponding to any set of $(\Psi_1, \Psi_2)$ values is performed in a simple manner similar to the case of domain klmn in FIG. 7. It may be noted here that such values as those of equations (14) and (15) multiplied by certain constants may also be used as new variables X and Y.

The coordinate transformation in the form of translation will now be described. By the above method of coordinate transformation in the form of rotation, the incident angle determination for any set of phase differences $(\Psi_1, \Psi_2)$ has been simplified. A complexity remains, however, with reference to some sets of $(\Psi_1, \Psi_2)$ when the phase difference assumes a value in the vicinity of 0 or 360 degrees.

Figure 9:
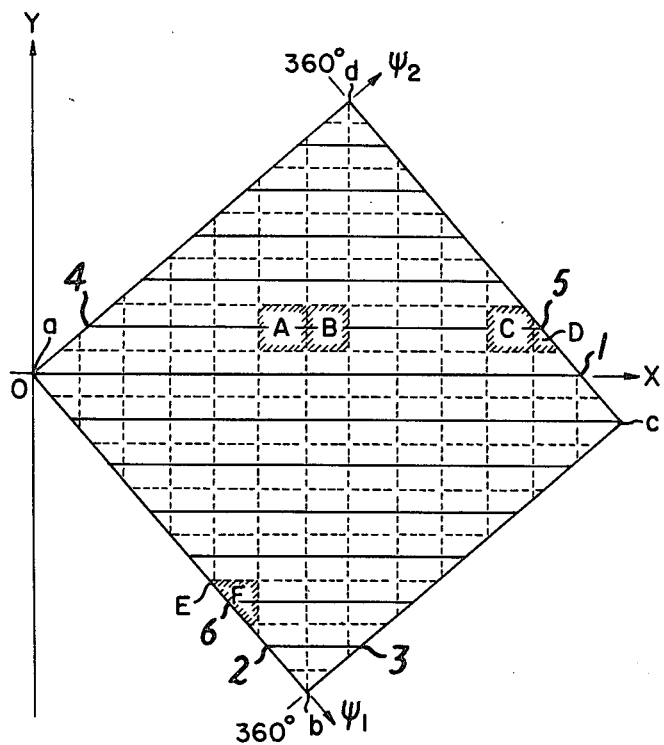
FIGS. 9 through 12 are descriptive graphic diagrams showing the function of radio angle measurement apparatus in accordance with the present invention.

Referring now to FIG. 9, there is shown an example of a phase locus in both the $(\Psi_1, \Psi_2)$ and (X, Y) coordinate systems. The rectangle abcd signifies the area in which the measured values of $(\Psi_1, \Psi_2)$ can exist; the solid line is the phase locus and the many rectangles bounded by broken lines are phase domains each of which corresponds to a certain value of incident angle. Since the phase locus has a continuity as was seen in FIG. 2, the locus of FIG. 9 is also continuous with respect to incident angle $\phi$, for example, at points 1 and 2, at points 3 and 4, and at points 5 and 6. While such domains, then as A and B in the figure, which are not on the 0 or 360 degrees boundary of the phase plane can have their corresponding incident angle values easily determined, such other domains as C, D, E and F require approximately twice as many operations as the others, since domains C and E are separate by the phase plane boundary, and so are D and F, even though they correspond to the same value of incident angle. It is to simplify this operation that the translation transformation is employed.

Figure 11:
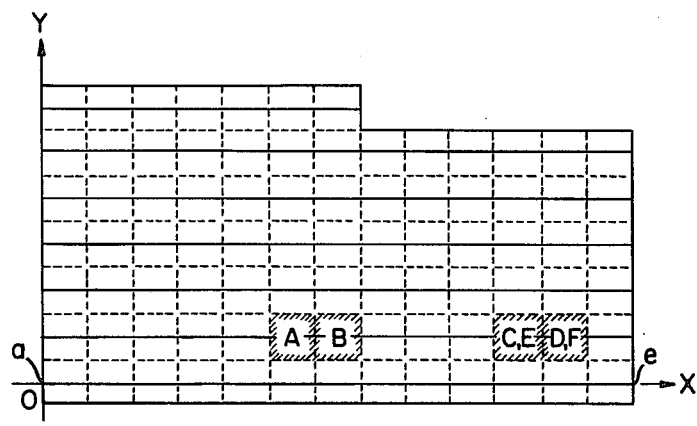
Figure 10:
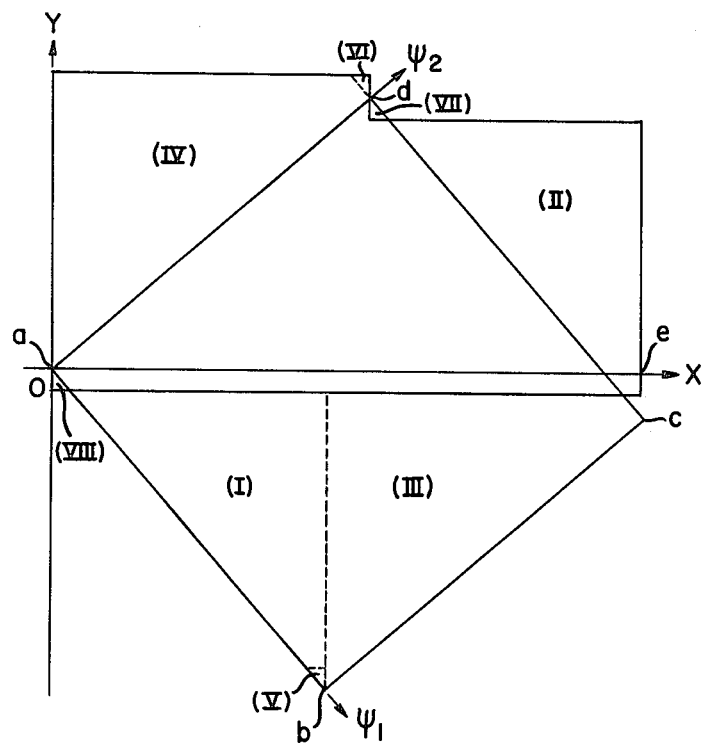

FIGS. 10 and 11 show a transformation of the $(\Psi_1, \Psi_2)$ space illustrated in FIG. 9 transformed by means of translation. After transformation of $(\Psi_1, \Psi_2)$ into (X, Y), a simple operation of comparison is performed in reference to X and Y to determine whether a given set of (X, Y) belongs to area (I) or (III) shown in FIG. 10. If it does, a simple operation of translation is performed to translate the areas (I) to areas (II), along the $\Psi_2$ axis by $2\pi$ radians, and likewise the area (III) is translated to area (IV) along the $\Psi_1$ axis by $2\pi$ radians. Again, it is determined whether a given set belongs to area (V) and (VII); if it does, it is translated to area (VI) along both the $\Psi_1$ and $\Psi_2$ axes by $2\pi$ radians each, and to area (VIII) along the $\Psi_2$ axis by $2\pi$ radians, respectively.

It is clear from a comparison of FIGS. 9 and 10 that the translations have been performed to preserve the continuity of the phase locus. Thus the sets of ($\Psi_1$, $\Psi_2$) that have less than a predetermined value of X are translated along the $\Psi_1$ or $\Psi_2$ or both axes by $2\pi$ radians, the axis along which the translations are performed being selected so as to keep the phase locus continuous. The resultant shape of the phase plane as shown in FIG. 11 is more orderly than before in that all its boundaries, as shown by the thick lines in the figure, are parallel to either the X or Y axis. As can be seen by comparing FIGS. 9 and 11, such domains A and B remain as before while such other domains as C and E that correspond to one continuous value of incident angle are now united into one continuous domain; so are such other domains as D and F, thereby reducing the number of operations required to determine the corresponding value of incident angles. Because the same holds good for all other domains along the boundary ab, bc, cd and da of FIG. 9, the determination of the incident angle corresponding to a particular phase domain is considerably simplified in the case of FIG. 11 after the translation, in comparison with the case of FIG. 9. It is worth noting here that only one common phase difference to incident angle converter means is required for this purpose because the above operation of translation such as that of the area (I) to area (II) in reference to FIG. 10 may be performed automatically on all the sets of (X, Y) values afer the transformation of ($\Psi_1$, $\Psi_2$) to (X, Y). Translations other than that shown in FIG. 10 are conceivable, and all such operations are to be considered as part of the invention so long as their aim is simplification of the determination of the incident angle value corresponding to a phase domain.

The operation of determining the angle sequence number will now be described. This is a scheme in which the values of Y and X, arranged in that order, form an "angle sequence number" which is a direct measure of the incident angle. By suitable choice of scale, the angle sequence numbers may be made to form a series of consecutive numbers.

Figure 12:
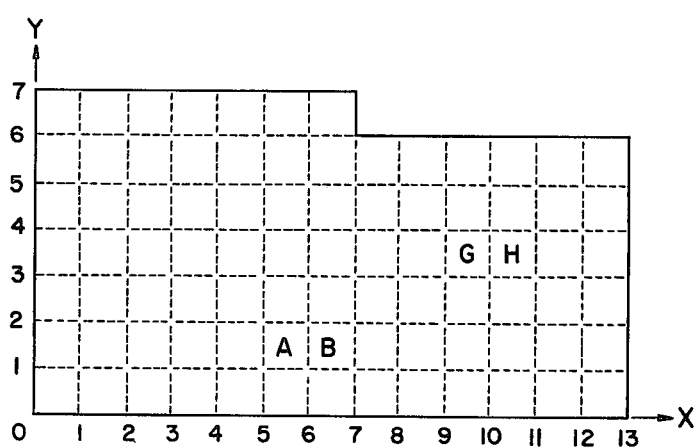

Referring now to FIG. 12, there is shown the phase plane of FIG. 11 wherein a slight translation along the Y axis is performed to eliminate the Y<0 portion thereof, and wherein suitable scales are chosen for X and Y to make $X_{max}=13$ and $Y_{max}=7$. The (X, Y) coordinate of the domains A, B, G and H are (5, 1), (6, 1), (9, 3) and (10, 3) respectively, and if they are arranged in a Y-X sequence as 1-5, 1-6, 3-9 and 3-10, these numbers directly form a series of consecutive numbers in a tridecimal system, and are direct measures of the incident angle.

While the descriptions hitherto have been made assuming an orthogonal coordinate system of the new variables (X, Y), the spirit of the invention is not so limited, but can also be applied to the case where the (X, Y) coordinate system is oblique as has been shown by the generalized equations (14) and (15). It is further possible to determine the aforementioned angle sequence number in a convenient manner, by suitable choice of scale of X, Y and resolution of phase difference measurement. Described below is a quantitative example where the coordinate system of the new variables (X, Y) is oblique and the angle sequence numbers form a series of consecutive numbers in a binary system. While the foregoing descriptions have beeen made in the abstract, describing only the relationships among the variables ($\Psi_1$, $\Psi_2$) and (X, Y) and their respective coordinate systems, it should be remembered that physical signals represent values of ($\Psi_1$, $\Psi_2$) and (X, Y), and the described transformations from the phase difference signals representing ($\Psi_1$, $\Psi_2$) to the new signals (X, Y) are carried out by signal processing implemented by the converter circuit 10.

Figure 13:
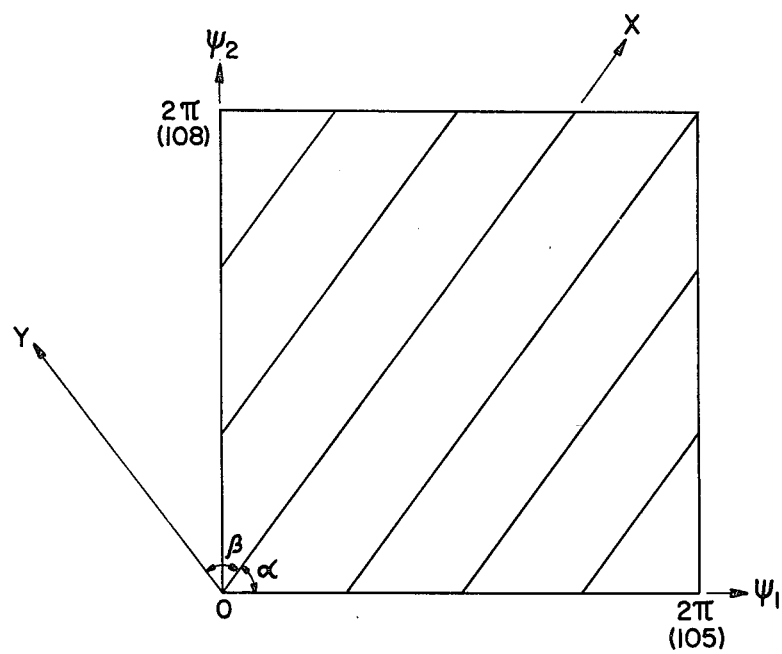
FIGS. 13 and 14 are descriptive graphic diagrams showing another function of radio angle measurement apparatus in accordance with the present invention.

In FIG. 13 is shown a phase plane where $d_1/d_2 = \frac{3}{4}$ and the phase differences ($\Psi_1$, $\Psi_2$) are, according to equation (5), $$\Psi_1/3 = \Psi_2/4 \tag{17}$$

Here we have the following relationship of the angles $\alpha$ and $\beta$ in the figure to determine the transformation of ($\Psi_1$, $\Psi_2$) into the oblique coordinate system (X, Y):

$$\cos \alpha = -3/5$$

$$\cos (\alpha + \beta) = 3/5$$

$$\sin \beta = 24/25$$

$$\sin \alpha = 4/5$$

$$\sin (\alpha + \beta) = 4/5$$

In order to substitute the above into the equations (14) and (15), and to perform a slight translation to eliminate the Y<0 portion, the phase difference-to-incident angle converter means generates signals X, Y having the following values:

$$X = A(4\Psi_1 + 3\Psi_2), \tag{18}$$

$$Y = B(-4\Psi_1 + 3\Psi_2 + \Psi_{2max}/2) \tag{19}$$

where A and B are coefficients so chosen as to define a suitable scale for X and Y.

Figure 14:
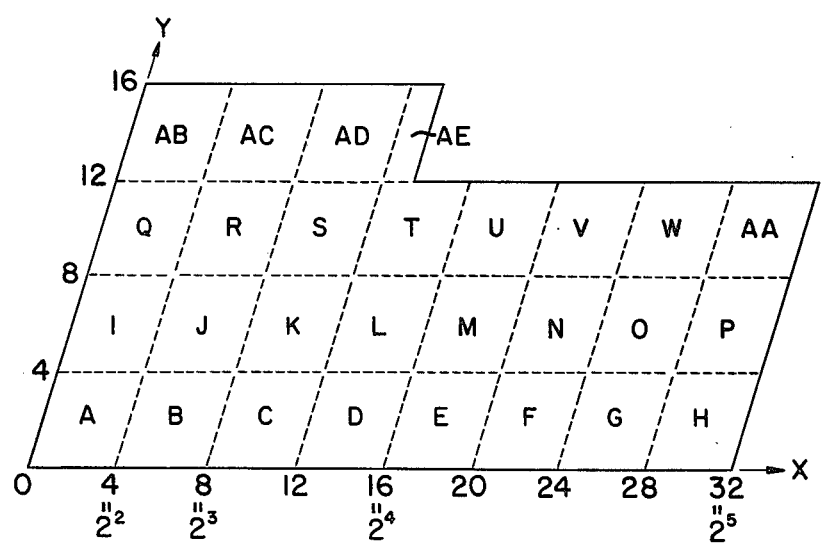

The digital phase difference measuring means 5 of FIG. 6 is now so constructed as to measure the phase difference $\Psi_1$ with a resolution of 360/108 degrees, and likewise the digital phase difference measuring means 6 measures $\Psi_2$ with a resolution of 360/112 degrees. The structure of such measuring means with a desired resolution has been given in detail in the aforementioned U.S. Pat. No. 3,787,863. The measured values of $\Psi_1$ and $\Psi_2$ will hereinafter be expressed simply by numbers corresponding to the above resolution unit: $\Psi_1 = 360°$ and $\Psi_2 = 360°$ will be expresseed as $\Psi_1 = 108$ and $\Psi_2 = 112$. By suitable choice of coefficients A and B to determine the scale of X and Y, the phase difference signals $\Psi_1$ and $\Psi_2$ are transformed into a new variable signal pair (X, Y) according to the following operation:

$$X = \Psi_1/6 + \Psi_2/8 \tag{20}$$

$$Y = -\Psi_1/7 + 3\Psi_2/28 + 2 \tag{21}$$

with the result that the phase plane ($\Psi_1$, $\Psi_2$) of FIG. 13 is transformed into the (X, Y) plane of FIG. 14, where the maximum values of X and Y are given by $$X_{max} = 32 = 2^5,$$

$$Y_{max} = 16 = 2^4.$$

Suppose now that the values of Y and X are arranged in that order after expressing them both in binary form and performing such operation as to make the columns of $X_{max} = 2^5$ and $Y_{max} = 2^4$ coincide (while omitting, for the time being, the columns of both X and Y that are $2^1$ and less). Then we have, for instance for the domain L of FIG. 14, $$X_L = 12 + 2^3 + 2^2 = 11 \text{ (binary)}.$$
$$Y_L = 4 = 2^2 = 1 \text{ (binary)}.$$

Arranging Y and X in that order and denoting the resultant number by Z then gives $$Z_L = 01011 \text{ (binary)}.$$

All other domains A, B, C, D, ..., etc. of FIG. 14 are expressed in the same manner as:

$$Z_A = 00000$$
$$Z_B = 00001$$
$$Z_C = 00010$$
$$Z_D = 00011$$
$$\ldots\ldots\ldots$$
$$Z_H = 00111$$
$$Z_I = 01000$$
$$\ldots\ldots\ldots$$
$$Z_L = 01011$$
$$Z_M = 01100$$
$$\ldots\ldots\ldots$$
$$Z_P = 01111$$
$$Z_Q = 10000$$
$$\ldots\ldots\ldots$$

The series of the above numbers is clearly a direct measure of incident angle, expressed by a series of consecutive binary numbers.

While this "angle sequence number" signal is determined at a uniform interval on the phase locus, it may be noted from equations (3) and (4) and FIGS. 2 and 4 that the scale of incident angle as such is not uniform on the phase locus, but the sine value thereof is. It presents no difficulty, however, to derive true angle value from the sine value, and the scale of true angle value may be regarded to be approximately at a uniform intermal except when the incident angle is fairly large. Moreover, it may even be more desirable to have the sine value than to have the true value in such cases as deriving height from elevation. The above fact, therefore, does not diminish the effectiveness of the invention in any manner.

The signal processing operations described mathematically as rotational and translational coordinate transformation and affixing of angle sequence number will now be described in a more general manner that encompasses all the previous examples. It is assumed that the angle between the $\Psi_1$ axis and the phase locus is $\alpha$, the direction of the X axis coincides with that of the phase locus and the direction of the Y axis forms an angle $\beta$ with the X axis, as in the case of FIGS. 7 and 13. The maximum possible values of $\Psi_1$ and $\Psi_2$, which are $2\pi$ radians, will be more generally given as $\Psi_{1max}$ and $\Psi_{2max}$, to permit them to be expressed by any unit, including the resolution of measurement as such. The coefficients A and B which define the scales of X and Y are also taken into consideration.

Figure 15:
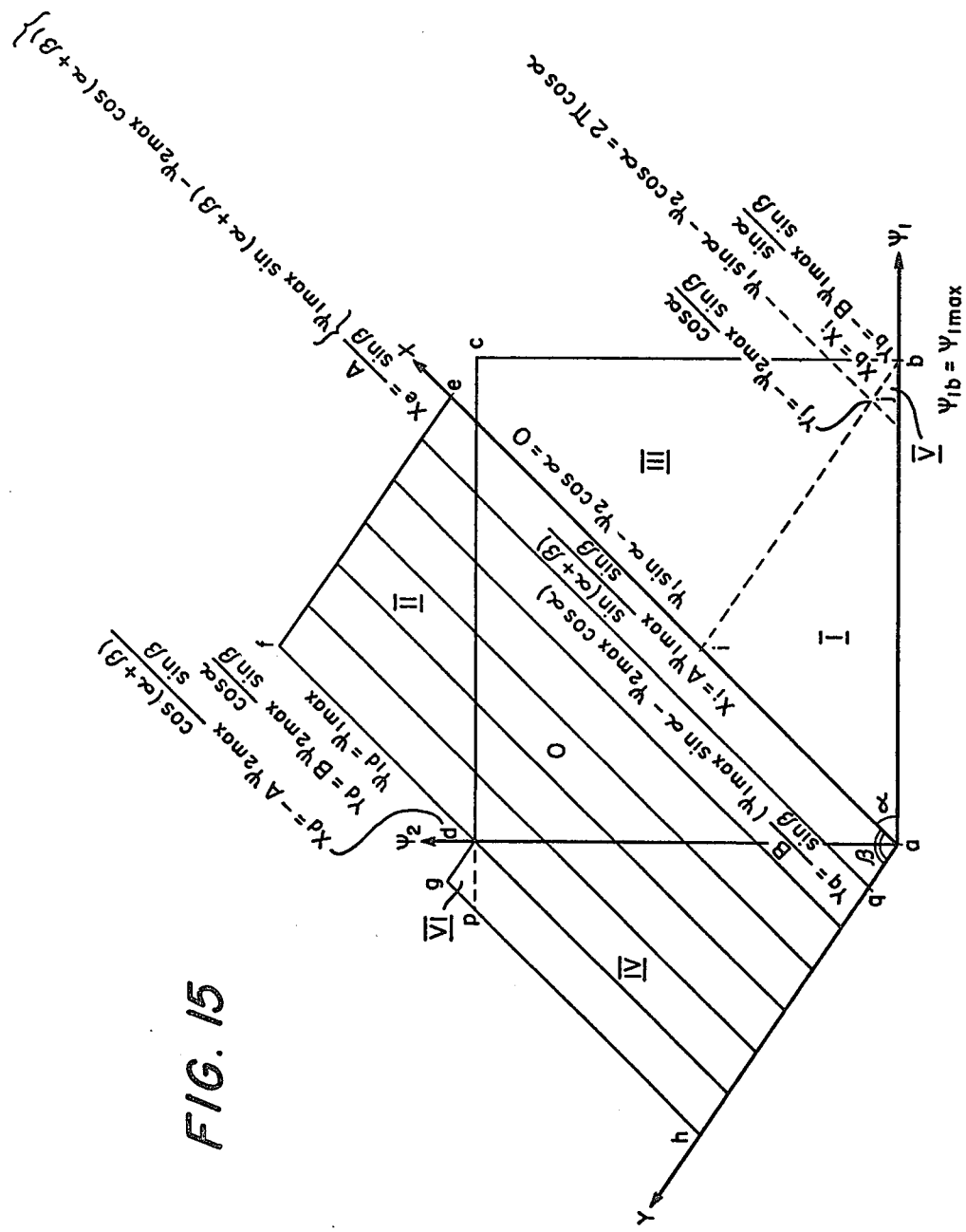
FIG. 15 is a graphic diagram of radio angle measurements according to the invention.

With these general assumptions, the mathematical relationships carried out in the signal processing can be readily derived by those who are versed in analytical geometry, and their derivations are not detailed here; only the results relevant to the present explanation are summarized in FIG. 15. The more general expression of the previously explained mathematical representations is given below, in relation to FIG. 15.

(i) $\Psi_1$, $\Psi_2$ are transformed into X, Y in accordance with equations (14) and (15). Inclusion of the above-mentioned coefficients A and B, however, results in the following transformation equations:

$$X_1 = (A/\sin\beta)\{\Psi_1 \sin(\alpha+\beta) - \Psi_2 \cos(\alpha+\beta)\}, \quad (22)$$

$$Y_1 = (B/\sin\beta)(-\Psi_1 \sin\alpha + \Psi_2 \cos\alpha). \quad (23)$$

The determination of A and B is discussed later.

(ii) If $Y_1 \geq 0$ (corresponding to area 0 of FIG. 15), then $X_1$, $Y_1$ are taken to be new variables X, Y.

The following operation is performed on $X_1$, $Y_1$ if $Y_1 < 0$.

(iii) If $X_1 \geq A\Psi_{1max} \sin(\alpha+\beta)/\sin\beta$ (area III of FIG. 15), $X_1$, $Y_1$ are further transformed as follows (translation of area III to area IV):

$$X = X_1 - A\Psi_{1max} \sin(\alpha+\beta)/\sin\beta, \quad (24)$$

$$Y = Y_1 + B\Psi_{1max} \sin\alpha/\sin\beta. \quad (25)$$

(iv) If $X_1 < A\Psi_{1max} \sin(\alpha+\beta)/\sin\beta$ and $Y_1 \geq -B\Psi_{2max} \cos\alpha/\sin\beta$ (area I of FIG. 15), then $X_1$, $Y_1$ are transformed as follows (translation of area I to area II):

$$X = X_1 - A\Psi_{2max} \cos(\alpha+\beta)/\sin\beta, \quad (26)$$

$$Y = Y_1 + B\Psi_{1max} \cos\alpha/\sin\beta. \quad (27)$$

(v) If $Y_1 < -B\Psi_{2max} \cos\alpha/\sin\beta$ (area V of FIG. 15), then $X_1$, $Y_1$ are transformed as follows (translation of area V to area VI):

$$X = X_1 - (A/\sin\beta)\{\Psi_{1max} \sin(\alpha+\beta) + \Psi_{2max} \cos(\alpha+\beta)\}, \quad (28)$$

$$Y = Y_1 - (B/\sin\beta)(\Psi_{1max} \sin\alpha + \Psi_{2max} \cos\alpha), \quad (29)$$

As a result, the area within which the values of X, Y exist is a protion of X, Y space aefdgh in FIG. 15, bounded only by lines parallel to the X or Y axis. Moreover, it is apparent that the values of X and Y vary in the following manner as the incident angle varies:

(a) Only the value of X varies as the incident angle varies continuously.

(b) When the value of X reaches a certain maximum amount $X_{max}$ which is equal to $X_e$ in FIG. 15:

$$X_{max} = (A/\sin\beta)\{\Psi_{1max} \sin(\alpha+\beta) - \Psi_{2max} \cos(\alpha+\beta)\} \quad (30)$$

the value of Y that has so far been constant varies abruptly in a step-function manner by an amount $Y_{step}$ which is equal to $Y_q$ in FIG. 15:

$$Y_{step} = (B/\sin\beta)(\Psi_{1max} \sin\alpha - \Psi_{2max} \cos\alpha), \quad (31)$$

and the value of X returns to zero. As the incident angle further continues to vary, the value of X again varies beginning from a value of zero.

The coefficients A, B are so chosen as to give suitable scales to the values of X and Y for convenient determination of the angle sequence number by realizing a suitable relationship between $X_{max}$ and $Y_{step}$. This relationship can be expressed as follows.

Either both $X_{max}$ and $Y_{step}$ are selected to be a common cardinal number R raised to the power of positive integers (for example: $X_{max}=32=2^5$ and $Y_{step}=4=2^2$ for FIG. 14), or $X_{max}$ is R raised to the power of positive integers and $Y_{step}$ is an integer (for example: $X_{max}=13=13^1$ and $Y_{step}=1$ for FIG. 12). This may be expressed as $$X_{max}=R^m, \text{ where m is a positive integer,} \quad (32)$$

$$Y_{step}=R^n, \text{ where n is zero or a positive integer.} \quad (33)$$

The coefficients A and B can then be determined from equations (30) to (33), as:

$$A = \frac{\sin\beta}{\Psi_{1max}\sin(\alpha+\beta) - \Psi_{2max}\cos(\alpha+\beta)} R^m \quad (34)$$

$$B = \frac{\sin\beta}{\Psi_{1max}\sin\alpha - \Psi_{2max}\cos\alpha} R^n. \quad (35)$$

These values of A and B are then used in the transformations of equations (33) and (23).

When the obtained value of Y is not a multiple of $Y_{step}$, it should be rearranged to the closest multiple of $Y_{step}$. This operation corresponds to examining which of the domains a set of inputs belongs, as explained in relation to equation (16). If [Y] is the integer part of Y, then for a value of Y on the phase locus $Y=Y_{step}[Y]$. A value of Y off the phase locus is tested to determine whether it is closer to one or the other of the two branches of the phase locus that it lies between, and the value of Y is set accordingly to $Y_{step}[Y]$ or $Y_{step}([Y]+1)$.

The final step, the affixing of the angle sequence number, is now simply achieved by setting the above-mentioned value of Y rearranged to the closest multiple of $Y_{step}$ equal to $NY_{step}$. Then the mere computation of NY step+X yields the angle sequence number which is a direct measure of the incident angle, forming a series of consecutive numbers with any desired cardinal number R. The object of angle measurement is now achieved.

Figure 16:
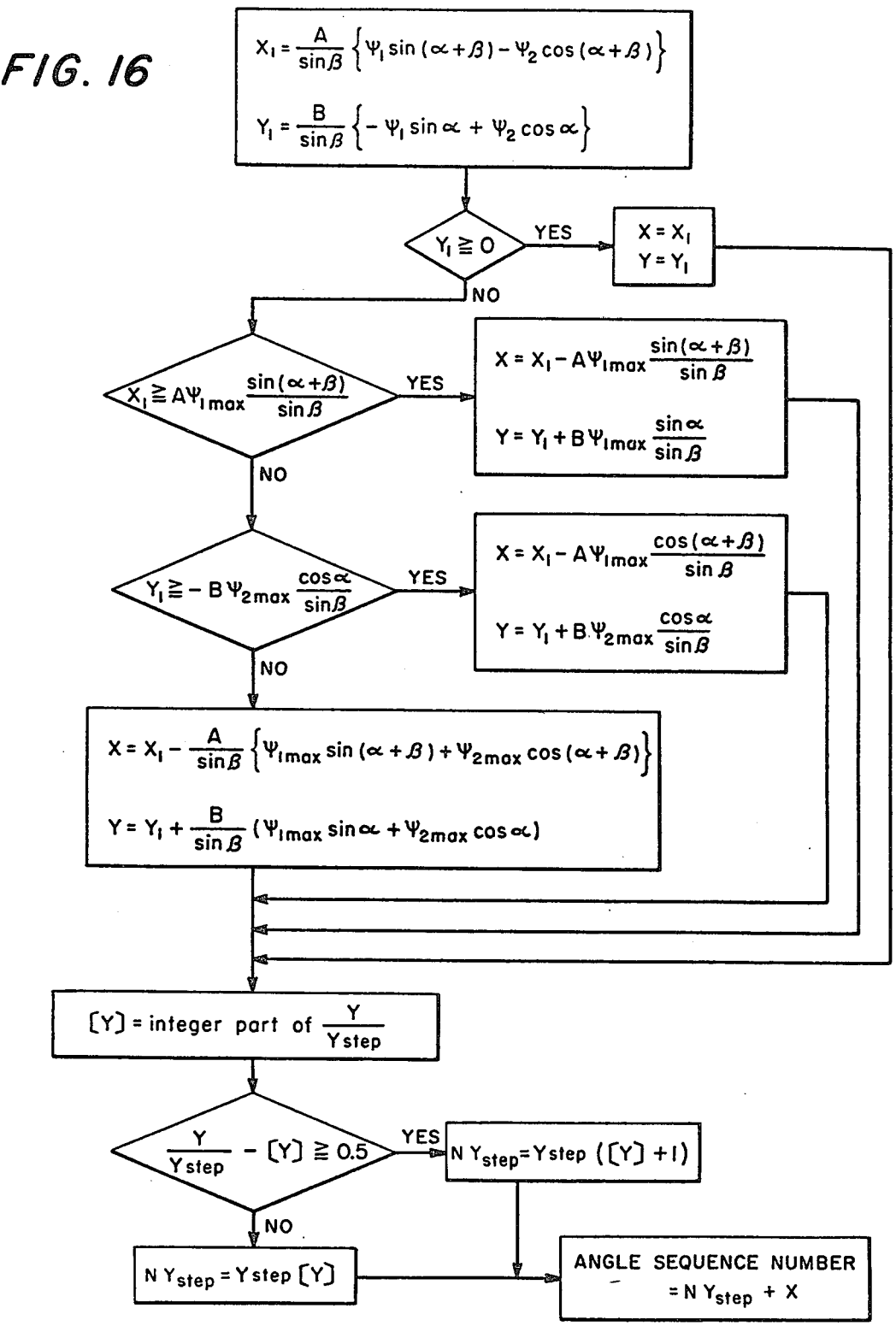
FIG. 16 is a diagram illustrating the transformations carried out by the phase difference to incident angle converter circuit according to the invention.

The signal processing operations heretofore described mathematically in a general manner are summarized in a flow diagram in FIG. 16 for ease of reference. In contrast to the aforementioned structure patented in U.S. Pat. No. 3,787,863 in which the incident angle values corresponding to a great number of phase difference value sets had to be memorized, it is apparent that the signal processing operation represented by FIG. 16 is a considerable simplification.

While the present invention has been described in conjunction with several particular embodiments, it is not so limited, but may be modified in various ways, some of which are shown below:

(1) The combination of radiator elements to be arrayed together in not limited to neighboring elements; it is possible to form an array by combining the radiator elements further apart from each other and to use the inter-element phase difference therebetween.

(2) The number of d/λ values of the antenna array (where d is the inter-element spacing, λ the propagation wavelength) is not limited to two; it is possible to use three, four, etc. values as has been shown in part of FIGS. 4 and 5. In such cases the number of phase differences measured is also three, four, etc., such as $\Psi_1$, $\Psi_2$, $\Psi_3$..., and the number of new variables is also three, four, etc., such as X, Y, Z, ....

(3) The means to realize two or more d/λ values is not limited to use of two or more values of d and one common value of λ; it is possible to use one common value of d and two or more values of λ, or to use these two methods in combination, in which cases the equations (3), (4), (5) and (13) are more generally expressed as the following:

$$\Psi_1=2\pi(d/\lambda)_1 \sin\phi, \Psi_2=2(d/\lambda)_2\sin\phi, \text{ etc.} \quad (36)$$

$$\Psi_1/(d/\lambda)_1 = \Psi_2/(d/\lambda)_2 \quad (37)$$

$$\alpha=\tan^{-1}\{(d/\lambda)_2/(d/\lambda)_1\} \quad (38)$$

(4) The number of radiator elements per array is not limited to the minimum number of two; antenna arrays of more than two radiator elements may be used.

Figures 17, 19:
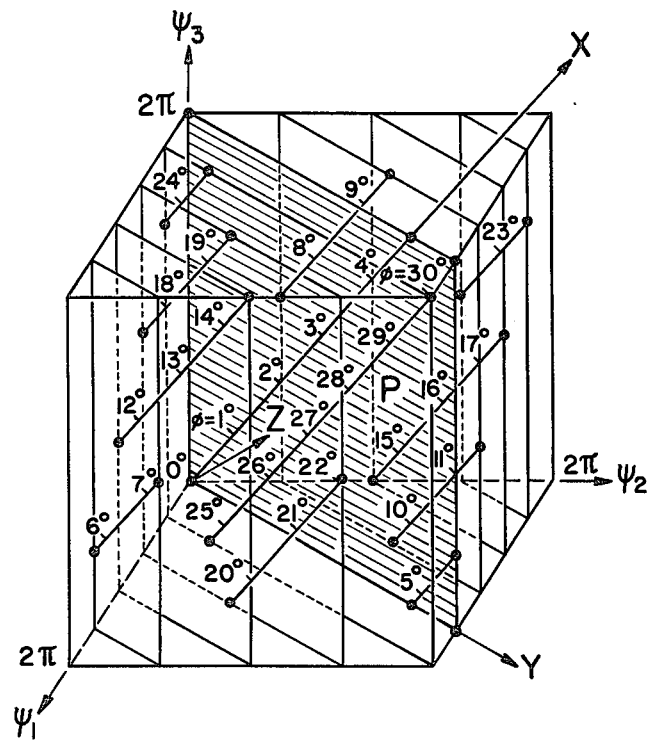
FIG. 17 is a conceptual graphic diagram showing the principle of radio angle measurement apparatus in accordance with the present invention in another form.
FIG. 19 is an illustration of how binary multiplication is carried out by the adder circuit of the phase difference converter illustrated in FIG. 18.

A graphical description of the above case (2) is given below for an example of three variables ($\Psi_1$, $\Psi_2$, $\Psi_3$). In FIG. 17 is shown an example of a new (X, Y, Z) coordinate system in the phase space of FIG. 4, so established as to fulfill the object of the invention. The conditions of establishing the new coordinate system may be expressed as follows.

(a) The X axis is chosen to be parallel to the phase locus; consequently only the value of X varies as the incident angle varies continuously.

(b) As the incident angle continues to vary, the phase locus appears in another place due to the recurrence of phase. The Y axis is chosen on the plane determined by two (or more) adjacent sectors of phase locus (the plane P of FIG. 17) and along a direction not parallel to the X axis. It is convenient, but not mandatory, to choose the Y axis perpendicular to the X axis. Consequently, when the value of X reaches a certain value, the value of Y that has so far been constant varies abruptly by some amount in a step-function manner.

(c) The Z axis is chosen along a direction that is not within the plane P determined by the X and Y axes. It is convenient, but not mandatory, to choose the Z axis perpendicular to the X and Y axes. Consequently, when the value of Y reaches a certain amount, the value of Z, that has so far been constant, varies abruptly by some amount in a step-function manner.

It is apparent that the operations that fulfill above conditions are possible in other cases than the examples hitherto given. It is further apparent that the above conditions can be readily expanded into the cases where four or more variables are employed, in which case the coordinate system of new variables (X, Y, Z, ...) may be established in a similar manner.

The aforementioned operation of translation may also be summarized in a more general manner as follows:

(d) The signal processing operation corresponding to translation along the $\Psi_1$, $\Psi_2$... axes are performed on such sets of sets of phase difference values ($\Psi_1$, $\Psi_2$, ...) as required (for example: areas (I), (III), (V) and (VII) of FIG. 10), so that all possible sets of phase difference values ($\Psi_1$, $\Psi_2$, . . . ), after transformation into the new variables (X, Y, . . . ), should exist within a limited portion of the (X, Y, . . . ) space (for example: the area within the thick lines of FIG. 10), the limited portion of the (X, Y, . . . ) space being bounded by subspaces (for example: planes in case of 3-dimensional space as in FIG. 17; lines in case of 2-dimensional plane as in FIG. 10) that are parallel to X, Y, . . . axes.

Further, the aforementioned operation of affixing the angle sequence number may be summarized in a more general manner as follows:

(e) When all possible sets of (X, Y, . . . ) values exist within the limited portion of the (X, Y, . . . ) space mentioned above (d), the operation of dividing the limited portion into a number of domains bounded by subspaces (for example: planes in the case of a three-dimensional space as in FIG. 17; lines in the case of a two-dimensional plane as in FIG. 10) that are parallel to the X, Y, . . . axes is carried out, and then the operation of arranging the values of (X, Y, . . . ) in accordance with said domains in the order of . . . , Y, X, and producing the arranged values as an output is carried out.

Further, the aforementioned quantitive example of affixing the angle sequence number described in connection with FIGS. 12 through 14 may be summarized in a more general manner as follows:

(f) The operation of steps (a) through (e) above is carried out with scales of X, Y, . . . such that, when X reaches a certain maximum value and Y varies abruptly by some amount in a step-function manner, either (i) both said values of X and Y are made to be numbers such as a desired cardinal number (for example: thirteen for FIG. 12 and two for FIG. 14) raised to the power of positive integers (for example: $32=2^5$ for X and $4=2^2$ for Y of FIG. 14), or (ii) the maximum value of X is a value as above and the value of Y is an integer (for example: $X=13=13^1$ and $Y=1$ in FIG. 12); and, in case still other variables(s) Z, . . . exist, a similar operation with scales of X, Y, Z, . . . so that Y and Z are so related to each other in a manner similar to that of X and Y, above.

The signal processing operations which have been described mathematically and graphically are, in practice, carried out electronically. The phase difference to incident angle converter means of the invention is a phase difference to incident angle converter means of the invention is a phase difference to incident angle converter circuit (or simply, phase difference converter circuit) and in the preferred embodiment the phase difference converter circuit is a digital binary circuit. Phase difference signals having values representative of the phase difference values $\Psi_i$ are applied to the phase difference converter circuit which performs the various signal processing operations previously described.

Within the phase difference converter circuit various internal digital binary signals are generated and transmitted between different stages of the phase difference converter circuit. In the following description and related drawings of the phase difference converter circuit the signal paths over which the digital binary signals flow are depicted by a single line, or a plurality of parallel lines each defining a signal path for a respective bit of the digital signal. It will be understood that a single line representing the signal path of a digital signal is physically a plurality of different conductors. Moreover, a digital signal is actually a plurality of different signals, each representing a respective bit of the digital signal. In the following description the individual signals representing bits of a particular digital signal are referred to as "bit signals".

The structure of the phase difference converter circuit is illustrated in detail in FIGS. 18-29. This circuit can perform the generalized signal processing scheme represented by FIG. 15 and the flowchart in FIG. 16.

Figure 18:
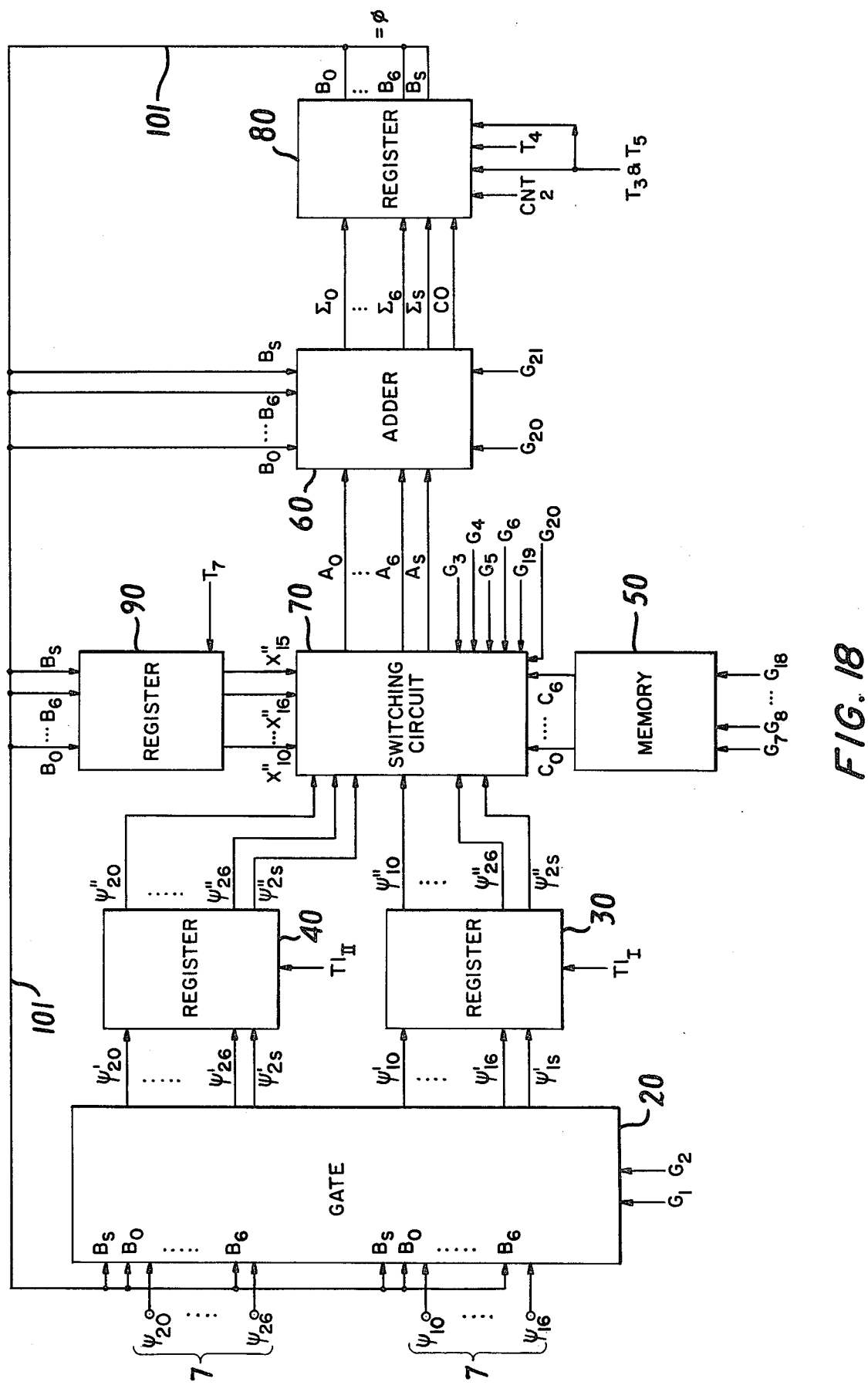
FIG. 18 is a schematic block diagram of the phase difference to incident angle converter circuit according to the present invention.

FIG. 18 is a block diagram of the entire phase difference converter circuit. This circuit has three basic operating modes which together can perform all of the signal processing operations represented in FIG. 16. These basic operating modes are (1) multiplication of a phase difference signal $\Psi$ by a constant to yield the result of the multiplication operation, (2) adding (or subtracting) the results of two different signal processing operations, and (3) comparing the result of a signal processing operation with a constant to determine which of the two has a larger magnitude.

The phase difference converter circuit 20 is comprised of different circuit elements. The gate circuit 20 controls the flow of input phase difference signals $\Psi$ and the flow of signals developed during intermediate steps of the signal processing. Register circuits 30, 40 temporarily store input phase difference signals $\Psi$ and signals developed during intermediate steps of the signal processing. The memory 50 permanently stores the values of twelve numerical constants and can be addressed to read out the value of any particular stored constant. The adder circuit 60 performs additional and multiplication (by repeated addition) operations on input signals applied to the adder circuit. The switching circuit 70 is controllable for selecting among output signals from various register circuits and the memory circuit, and for applying the selected signals to the adder circuit.

All of the circuit elements shown in FIG. 18 are digital binary circuits. Circuit paths between the various circuit elements are represented by lines; in some instances a single line represents multiple signal paths for passing a multi-bit binary signal in parallel bit format. For example, signal path 101 is illustrated at some portions by multiple lines to indicate parallel signal paths for bit signals $B_o$, $B_1$ . . . $B_6$, $B_s$, and is illustrated at other portions by a single line. Where appropriate, mention is made of whether a signal path represented by a line is comprised of a single signal path or multiple signal paths. The disclosed preferred embodiment is comprised of circuitry having seven bit data signals (plus a sign bit).

Figure 20A:
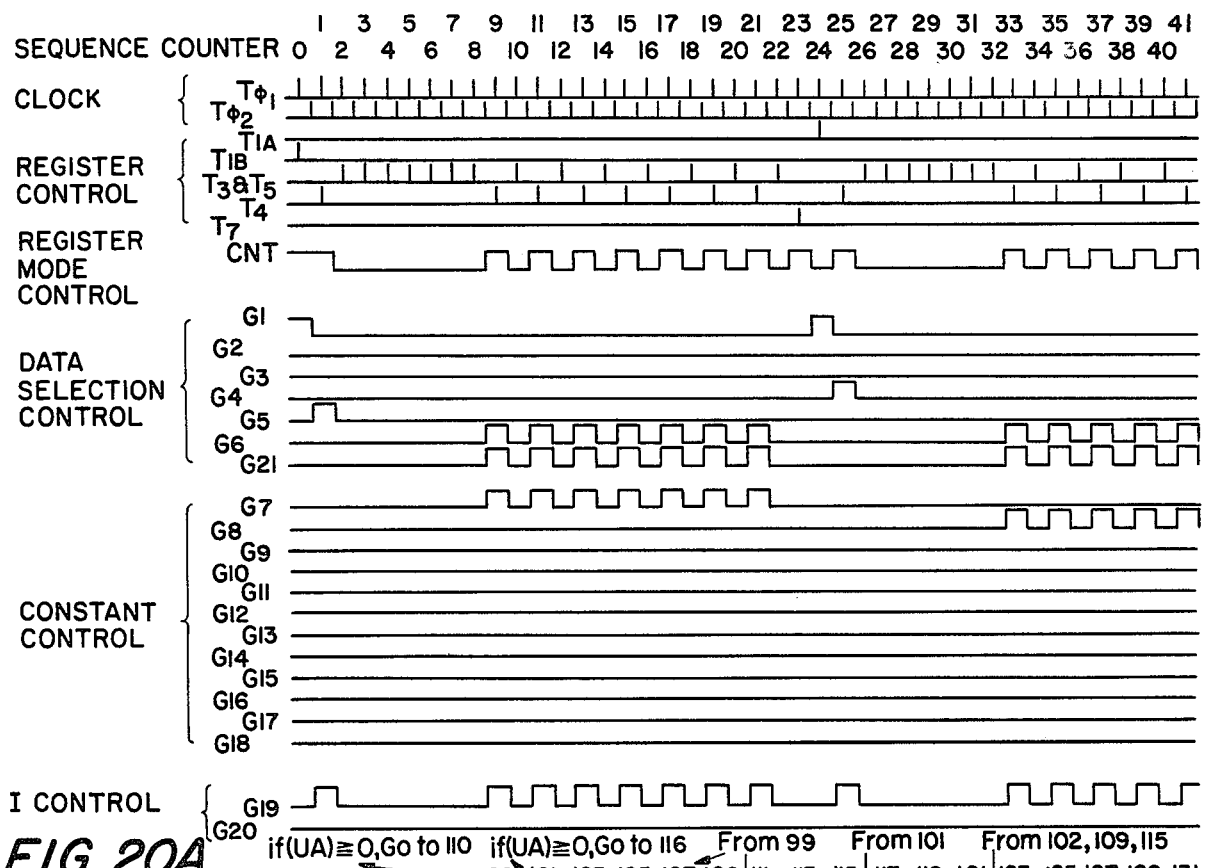
FIGS. 20A and 20B are waveform diagrams illustrating the waveforms of the various signals developed during operation of the phase difference converter.
Figure 20B:
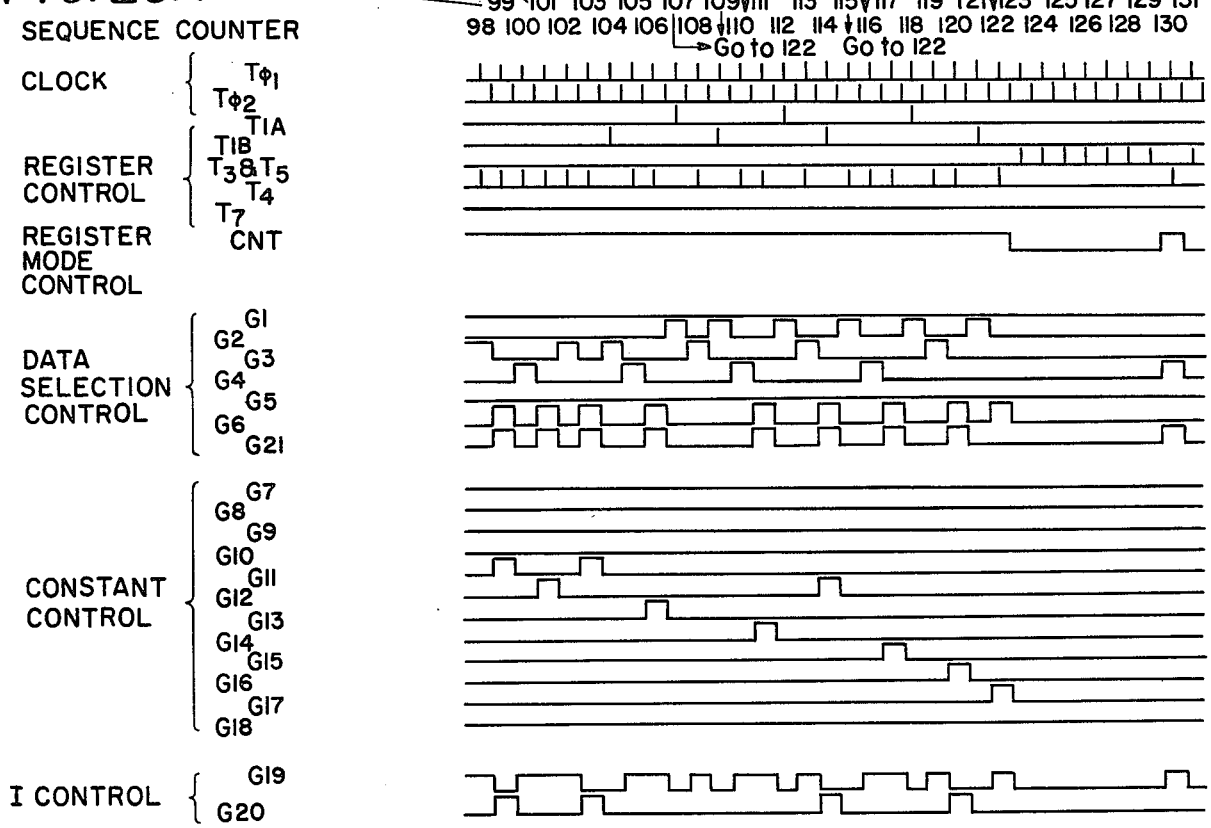

FIG. 18 illustrates control signals G1-G21, CNT and T1-T5 as being applied to the various circuit stages comprising the phase difference converter circuit. These control signals are generated by control signal generating means which is illustrated in detail in FIGS. 28 and 29. The waveforms of the control signals and their relative timing is shown in FIGS. 20A and 20B.

The three basic operating modes of the phase difference converter circuit can be understood by referring to FIG. 18. To multiply the input phase difference signal $\Psi$ by a constant, the control signal G1 is applied to open the gate 20 so that the gate passes the phase difference input signal $\Psi_1$ applied to input terminal set 7. The phase difference input signal, after it passes through the gate 20, is designated $\Psi_1'$ and is stored in the register 30 in a parallel binary signal format.

Control signal G4 is applied to the switching circuit to allow it to receive the value of the phase difference signal from register 30. The phase difference signal, when it is read out of the register 30, is designated $\Psi_1''$. Simultaneously, control signal G7 is applied to the memory 50 which is effective to read out the value of the first constant $C_1 = A \sin(\alpha+\beta)/\beta$ in a binary 7-bit parallel signal format; $C_{010}, C_{011} \ldots, C_{016}$. Control signal G6 opens the switching circuit 70 to receive the memory output signal, and both the phase difference signal $\Psi_1''$ and the signal having constant value $C_1$ are transferred to the adder circuit 60.

Control signal G19 is then applied to the adder circuit 60 for operating the adder circuit to add the two data signals that were transferred to the adder circuit. The addition operation is carried out in conjunction with register 80. The register 80 is a shift register which detects the value "1" or "0" of each bit of a binary multiplier signal and, in accordance with the detected "1" or "0" value, adds or shifts by one bit a binary multiplicand to carry out binary multiplication by repeated additions. The result of the addition operation is temporarily stored in register 90.

As an example of binary multiplication carried out by repeated additions, the multiplicand 1011010 is multiplied by the multiplier 1000101 as shown in FIG. 19. In the above example the symbol "←" indicates a shift by one bit. The multiplication is carried out by shifting the multiplicand by a number of places determined by the positions of the "1.s" in the multiplier, and adding the shifted multiplicands. This shifting of the multiplicand is carried out by the register 80.

The second mode of operation of the phase difference converter circuit carries out the operation; $\text{result}_1 \pm \text{result}_2 = X$. Assume that $\text{result}_1$ is stored in register 90 and that $\text{result}_2$ is stored in register 80. Control signal G3 applied to the switching circuit causes the $\text{result}_1$ to be transferred to the adder to be added to (or subtracted from) $\text{result}_2$. Selection between the addition and subtraction operations is accomplished by the adder control signal G19 or control signal G20, respectively. The result X is temporarily stored in register 90.

The third mode of operation of the phase difference converter circuit compares the numerical value of a signal with the value of a stored numerical constant. Assume that the value of a signal, such as the result of a computation, is stored in register 30. Control signal G4 opens the switching circuit to register 30 for receiving the stored signal. Simultaneously, one of the control signals G7–G18 is applied to the memory 50 to cause one of the twelve stored numerical constant values to be read out of the memory. The memory output signal having the read out constant value is transferred to the adder circuit.

Control signal G20 is then applied to the adder circuit 60 to operate it to subtract the value of the constant read out from the memory 50 from the value of the signal received from register 30. The sign bit of the result of the subtraction operation is detected by register 80. The value of the sign bit, i.e. whether it is "1" or "0" indicates whether the value of the read out constant or the data signal applied from register 80 is larger. This comparison operation is always performed on the content of register 80.

Phase Difference Converter Circuit Operation

To illustrate how the three basic operating modes just described can perform the signal processing scheme described in conjunction with FIG. 16, the first step of the signal processing will be described in detail.

First, the signals $\Psi_2$ and $A \cos(\alpha+\beta)/\sin\beta$ are multiplied. This is a mode one operation. Phase difference input signal $\Psi_2$ is temporarily stored in register 40, and the constant $C_2 = A \cos(\alpha+\beta)/\sin\beta$ is read out of the memory 50. Both signals are transferred to the adder circuit 60 and multiplication is performed, and the result of the multiplication operation is stored in registers 80 and 90. Second, the signals $\Psi_1$ and $A \sin(\alpha+\beta)\sin\beta$ are multiplied. This is a mode one operation. Input signal $\Psi_1$ is temporarily stored in the register 30, and the constant $C_1 = A \sin(\alpha+\beta)/\sin\beta$ is read out of the memory 50. Both signals are transferred to the adder circuit 60 and multiplication is performed, and the result of the multiplication operation is stored in register 80. (The result of the previous operation stored in register 80 is thus lost, but this is of no consequence because the result of the previous operation is also stored in register 90 for further use.)

Third, the signals $C_1\Psi_1$ and $C_2\Psi_2$ are subtracted to yield the result $X_1$. This is a mode two operation. The signals stored in registers 80 and 90 are transferred to the adder circuit and subtracted to yield $X_1$, and the signal $X_1$ is stored in both registers 80 and 90.

The remaining steps in the signal processing sequence represented by the flowchart in FIG. 16 are carried out by the phase difference coverted circuit using the three basic operating modes of that circuit. The sequence of signal processing steps for the first four stages of the signal processing sequence shown in FIG. 16, and the corresponding basic operating modes, are set forth in the following Table I. The first three steps in Table I have been described in detail and the remaining steps can be understood by comparing them with FIG. 16.

TABLE I

| Step | Mode of Operation | R30 | R40 | R80 | R90 | Associated Constant |
|---|---|---|---|---|---|---|
| 1 | 1 | | $\Psi_2$ | $\dfrac{A\cos(\alpha+\beta)}{\sin\beta}\ \psi_2$ | same as R80 | $\dfrac{A\cos(\alpha+\beta)}{\sin\beta}$ |
| 2 | 1 | $\Psi_1$ | " | " | $\dfrac{A\sin(\alpha+\beta)}{\sin\beta}\ \Psi_1$ | $\dfrac{A\sin(\alpha+\beta)}{\sin\beta}$ |
| 3 | 2 | " | " | " | $R90 - R80 = X_1$ | |
| | | | | $X_1 \longleftarrow$ | | |
| 4 | 1 | $\Psi_1$ | $\Psi_2\ X_1$ | | $\dfrac{B\sin\alpha}{\sin\beta}\ \psi_1$ | $\dfrac{B\sin\alpha}{\sin\beta}$ |
| | | | $\dfrac{B\sin\alpha}{\sin\beta}\ \psi_1 \longleftarrow$ | | | |
| 5 | 1 | " | " | " | $\dfrac{B\cos\alpha}{\sin\beta}\ \psi_2$ | $\dfrac{B\cos\alpha}{\sin\beta}$ |

TABLE I-continued

| Step | Mode of Operation | Data stored in the Registers | | | | Associated Constant |
|------|---|-----|-----|-----|-----|-----|
| | | R30 | R40 | R80 | R90 | |
| 6 | 2 | " | " | " | $R90 - R30 = Y_1$ $Y_1 \leftarrow$ ──────┘ | |
| 7 | 3 | " | " | " | $Y_1$ − Const. < 0 | 0 |
| 8 | 3 | " | " | $X_1 \longrightarrow X_1$ $X_1$ − Const. $\geqq 0$ | | $A\Psi_{1max} \dfrac{\sin(\alpha + \beta)}{\sin\beta}$ |
| 9 | 2 | " | " | $X_1 \longrightarrow X_1$ $X_1$ − Const. = X $X \longrightarrow$ output | | " |
| 10 | 2 | $Y_1 \longrightarrow Y_1$ | " | " | $Y_1$ + Const. = Y $Y \longrightarrow$ output | $B\Psi_{1max} \dfrac{\sin\alpha}{\sin\beta}$ |

The names and functions of the various control signals within the phase difference converter circuit are set forth in Table II. Circuitry for generating the control signals is described in detail in conjunction with FIGS. 28 and 29.

TABLE II

| Signal | Function | Associated Cct. Element |
|---|---|---|
| G1 | Select input $\psi$ | Gate 20 |
| G2 | Select Register 80 output | " |
| G3 | Select Register 90 output | Switching Circuit 70 |
| G4 | Select Register 30 output | Switching Circuit 70 |
| G5 | Select Register 40 output | Switching Circuit 70 |
| G6 | Select Memory output (constants) | Switching Circuit 70 |
| G7 | Read out first constant | Memory 50 |
| G8 | Read out second constant | " |
| . | . | . |
| . | . | . |
| . | . | . |
| G18 | Read out twelfth constant | Memory 50 |
| G19 | Add | Switching Circuit 70, Adder 60 |
| G20 | Subtract | Switching Circuit 70, Adder 60 |
| G21 { High | Add or Subtract | Adder 60 |
| Low | Transfer to Register 80 | " |
| CNT { High | Read Adder output into the upper half of Register 80 at timing T4 | Register 80 |
| Low | Shift by one bit the contents of upper half of Register 80 at timing T3 | " |

The detailed operation sequence for carrying out the entire signal processing operation represented by the flowchart in FIG. 16 is tabulated in Table III. This operating sequence is carried out in synchronism with a master clock pulse train. The sequence of operations represented in FIG. 16 can be performed within 146 clock pulses. Therefore, the sequence of operations tabulated in Table III is numbered 0 to 146.

TABLE III

| Sequence Counter Number | Operations | Remarks |
|---|---|---|
| 0 | $\psi_2 \rightarrow$ Register 40 | hereafter, Register 40 is simply "R40" |
| | | "$\rightarrow$" means data transfer. |
| 1 | (R40)$\rightarrow$U80 | (R40) means contents of R40. |
| | | U80 is upper 1 word of Register 80. |
| 2~8 | (U80)$\rightarrow$L80 | L80 is lower 1 word of Register 80. |
| | 0$\rightarrow$U80 | This operation is accomplished by 7 bits right shift of Register 80. |
| 9 | if LSB of L80 is 1, (U80)+(C)$\rightarrow$U80 otherwise 0$\rightarrow$U80 | (C) means a constant. in this case, (C) = $\{A\cos(\alpha+\beta)/\sin\beta\}$ |
| 10 | right shift U80 and L80 by one bit. | |
| 11~22 | repeat 9~10, total 7 times | operations 9~22 correspond to (L80)X(C)$\rightarrow$U80. |
| 23 | (U80)$\rightarrow$Register 90 | hereafter, Register 90 is simply "R90". |
| | | (R90)=$\{A\cos(\alpha+\beta)/\sin\beta\}\psi_2$ |
| 24 | $\psi_1 \rightarrow$ Register 30 | hereafter, Register 30 is simply "R30". |
| 25 | (R30)$\rightarrow$U80 | |
| 26~32 | (U80)$\rightarrow$L80 0$\rightarrow$L80 | same as sequences 2~8. |
| 33 | if LSB of L80 is 1, (U80)+(C)$\rightarrow$ U80, otherwise 0$\rightarrow$U80 | same operations as sequence 9. here (C)=$A\sin(\alpha+\beta)/\sin\beta$. |
| 34 | right shift U80 and L80 by one bit | same as sequence 10. |
| 35~46 | repeat 33~34, total 7 times | same as sequence 11~22. |
| 47 | (U80)−(R90)$\rightarrow$U80 | |
| 48 | (U80)$\rightarrow$R90 | $X_1$ is obtained in R90. |
| 49 | $\psi_1 \rightarrow$R30 | |
| 50 | (R30)$\rightarrow$U80 | |
| 51~57 | (U80)$\rightarrow$L80 0$\rightarrow$L80 | same as sequence 2~8. |
| 58 | if LSB of L80 is 1, (U80)+(C)$\rightarrow$U80, otherwise, 0$\rightarrow$U80 | same operations as sequence 9. here, (C)=$B\sin\alpha/\sin\beta$ |
| 59 | right shift U80, L80 by one bit. | same as sequence 10. |
| 60~71 | repeat 58~59, total 7 times | same as sequence 11~22. |
| 72 | (U80)$\rightarrow$R30 | (R30)=$(B\sin\alpha/\sin\beta)\psi_1$ |
| 73 | $\psi_2 \rightarrow$R40 | |
| 74 | (R40)$\rightarrow$U80 | |
| 75~81 | (U80)$\rightarrow$L80 0$\rightarrow$U80 | same as sequence 2~8. |
| 82 | if LSB of L80 is 1 | same operations as sequence 9. here, (C)=$B\cos\alpha/\sin\beta$. | signal is applied to the memory circuit the corresponding NAND gates within each of the groups that correspond to that particular control signal are enabled to develop respective output signals determined by the second signals that are applied to those NAND gates. For example, when control signal G7 is applied, the NAND gates that receive the input signals $C_{010}$, $C_{011}$, $C_{012}$, ... $C_{016}$ are enabled to develop a set of output signals $C_0$, $C_1$ ... $C_6$ that are determined by the NAND gate input symbols. Thus, by selecting the values of the NAND gate input signals $C_{ijk}$ to be either "1" or "0", the twelve control signals G7 to G18 will each read out one of twelve constants having respective values determined by the NAND gate input signals $C_{ijk}$. The value of a particular NAND gate input signal $C_{ijk}$ is set by connecting the corresponding NAND gate input to a high signal level, such as a supply voltage, or a low signal level, such as ground.

Figure 24:
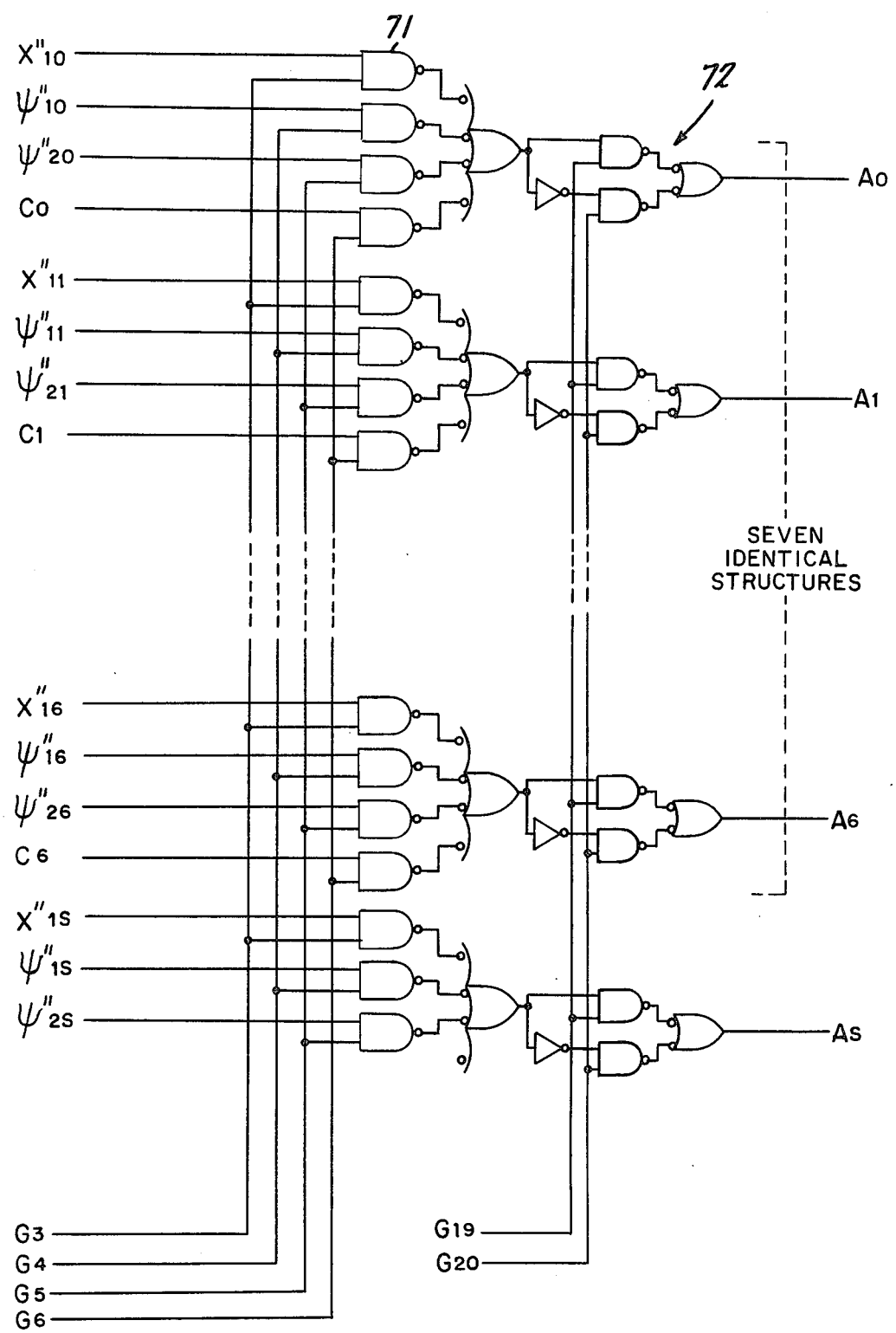
FIG. 24 is a schematic circuit diagram of a switching circuit in the phase difference converter illustrated in FIG. 18.

FIG. 24 illustrates the circuitry of the switching circuit 70 for selecting among the phase difference signals $\Psi_1'$, $\Psi_2''$, the memory output signal C, and the register 90 output signal X''. The switching circuit is comprised of a plurality of groups of four NAND gates 71. Each group of four NAND gates corresponds to one bit of the selected signal, and in the disclosed preferred embodiment there are seven groups of four NAND gates. Additionally, there is a group of three NAND gates which correspond to the sign bit of the selected signal.

Four control signals G3–G6 are applied to the switching circuit 70 for determining which signals are selected by the switching circuit. Control signal G3 corresponds to register 90 output signal X'', control signal G4 corresponds to phase difference signal $\Psi_1''$, control signal G5 corresponds to phase difference signal $\Psi_1''$ and control signal G6 corresponds to memory signal C. Each control signal is applied to a corresponding NAND gate within each of the seven groups of four NAND gates. The four NAND gates within each group receive a corresponding bit signal from one of the signals X'', $\Psi_1''$, $\Psi_1''$ and C, and each NAND gate that receives a bit signal from the same signal to be selected also receives the same control signal. Therefore each control signal is effective to select all of the bit signals comprising one of the signals to be selected by enabling all of the NAND gates corresponding to that signal.

The switching circuit 70 also receives control signals G19, G20. These control signals are both applied to each of eight output gate groups 72. Each of the output gate groups is connected to a respective one of the seven groups of four NAND gates and the one group of the three NAND gates. When the gate signal G19 is applied the output gate groups pass the input signals applied thereto, and when the gate signal G20 is applied the output gate groups pass the complement of the input signals applied thereto. The control signals G19 and G20 correspond to the addition and subtraction modes of the adder circuit 60. More particularly, the following control signal levels correspond to the following modes: (1) G19=H, G20=L, addition; (2) G19=L, G20=H, subtraction; (3) G19=G20=H, not used; (4) G19=G20=L, switching circuit output $=\phi$.

Figure 25:
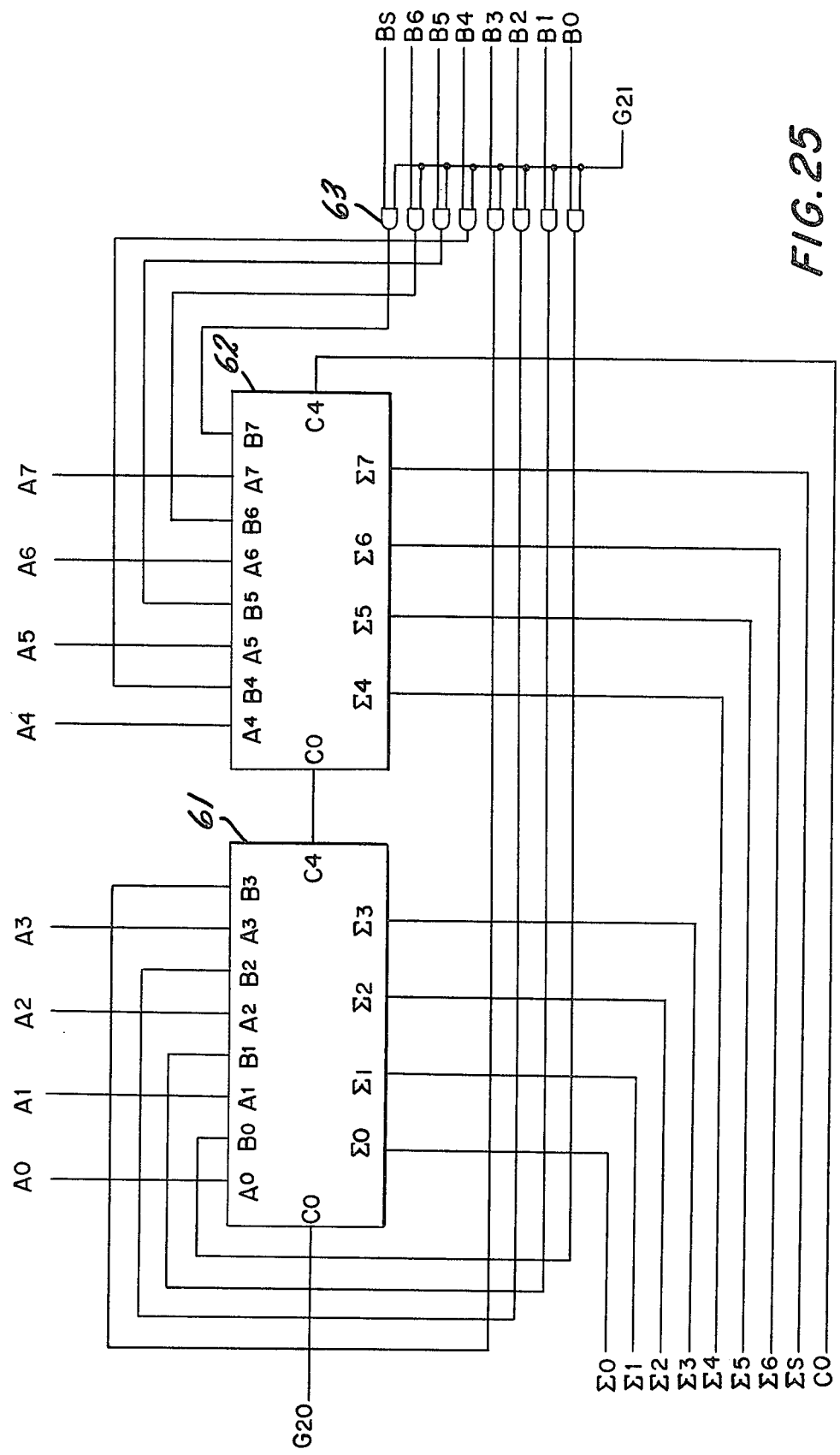
FIG. 25 is a schematic circuit diagram of an adder circuit in the phase difference converter illustrated in FIG. 18.

FIG. 25 illustrates the details of the adder circuit 60. The adder circuit is comprised of a pair of four-bit parallel adders 61, 62 with the switching circuit 70 output signal applied directly to the adders, and with the register 80 output signal B applied to the adders through a plurality of AND gates 63. The AND gates also receive control signal G21 which is effective to control the application of the register 80 output signal B to the adders. The control signal G20 applied to the pair of adders controls the addition and subtraction modes of the adders.

Figure 26:
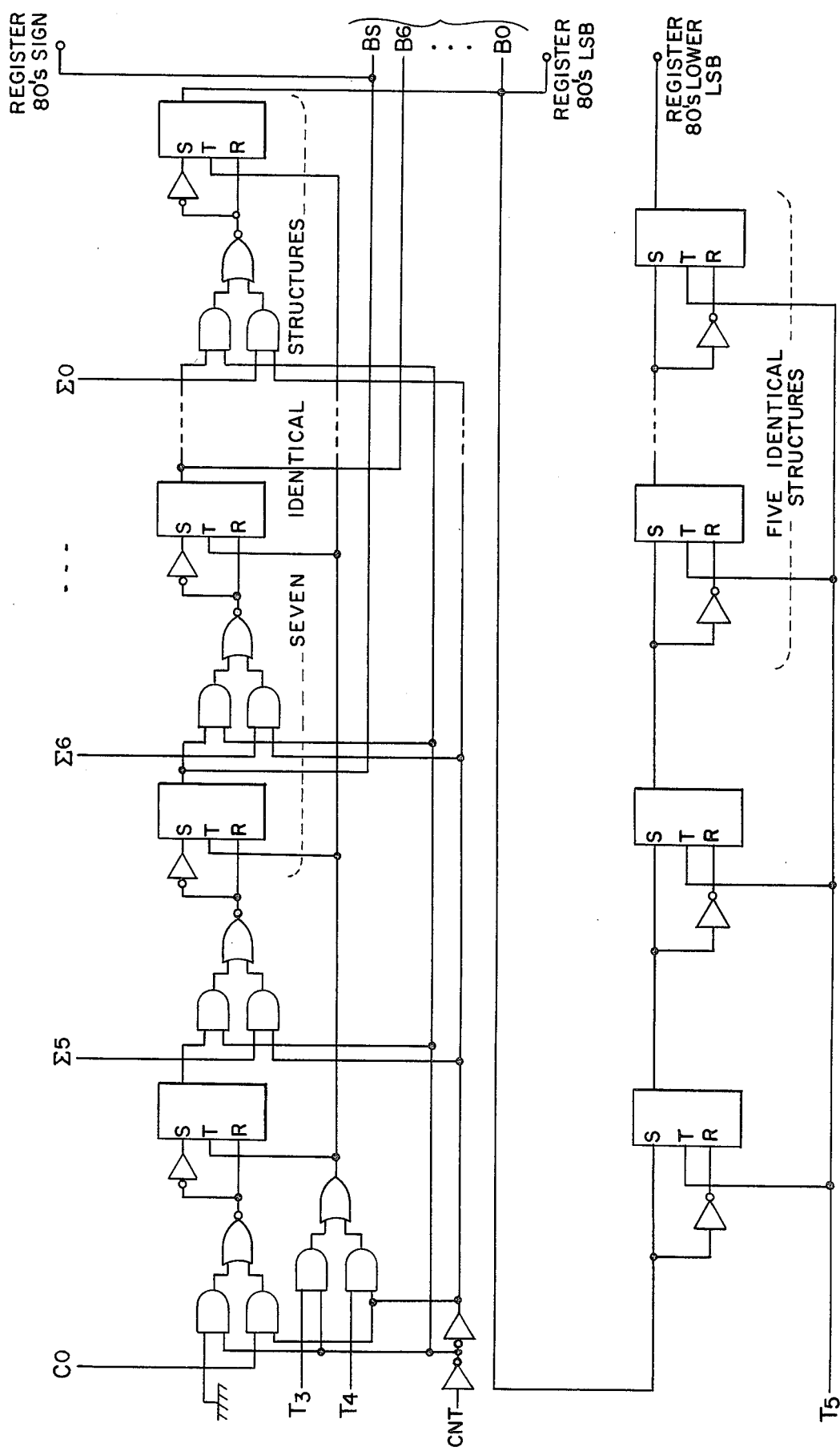
FIG. 26 is a schematic circuit diagram of the register circuit A in the phase difference converter illustrated in FIG. 18.

FIG. 26 illustrates the details of register 80. The output signal $\Sigma$ of the adder circuit 60 is applied in a parallel signal format for setting the states of the flip-flop circuits 81, and the output signal B corresponding to the states of the flip-flops is also reach out in a parallel signal format. Register 80 is a shift register for shifting the flip-flop states under control of control signal CNT. The shifted flip-flop states can then be read out as the output of the adder circuit shifted for storage in register 90 to allow multiplication, by repeated addition, of an input of the adder circuit and the content of register 90.

Figure 27:
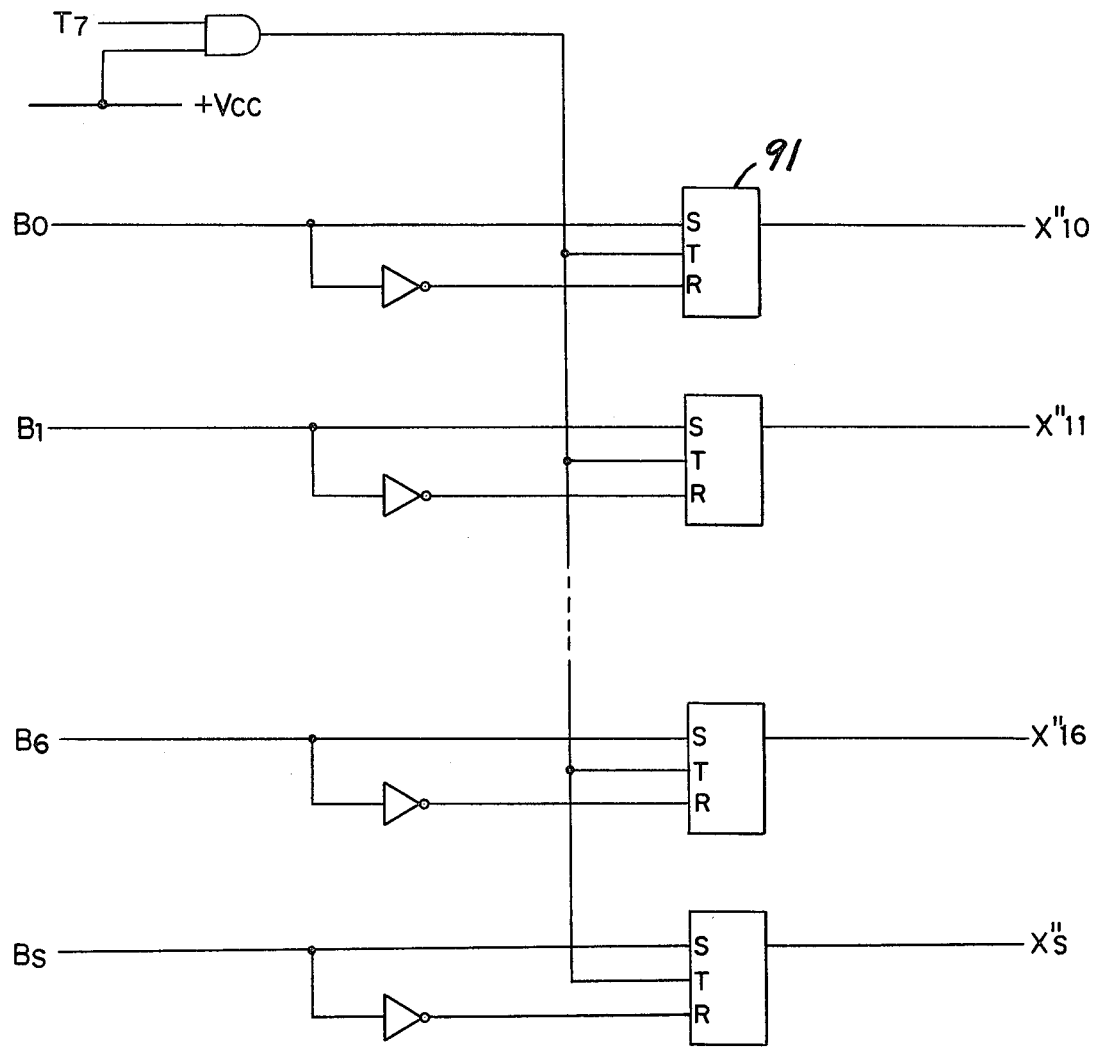
FIG. 27 is a schematic circuit diagram of the register circuit B in the phase difference converter illustrated in FIG. 18.

FIG. 27 illustrates the details of register circuit 90. Register circuit 90 includes eight flip-flop circuits 91 each of which corresponds to one of the bit signals $B_0$, $B_1$ ... $B_6$, $B_s$ comprising the output signal from the adder circuit. The adder circuit output signal is effective to set the states of the flip-flop circuits, under control of the control signal T7, and eac of the flip-flop circuits develops an output signal according to the state of the flip-flop circuit and hence the particular bit signal $B_i$ applied to the flip-flop circuit. The set of flip-flop circuit output signals $X_{10}''$ ... $X_{16}''$, $X_s''$ together comprise the output signal of the register circuit 90.

FIG. 29 illustrates the details of the control signal generator circuit. A two phase clock signal generator 10 generates a pair of clock signals $T\phi_1$ and $T\phi_2$, each comprised of a periodic clock pulse train. The two clock signals have a relative phase difference between them, and the two clock signals together provide timing control for the entire phase difference signal converter circuit. The control signal $T\phi_2$ is applied to the sequence counter 111 for operating the sequence counter to generate the control signals according to the proper sequence for operation of the phase difference signal converter circuit. Additionally, the control signal $T\phi_1$ is applied to a plurality of AND gates 112 for controlling the transmission of the control signals $T_{1a}$, Thd 1b, $T_3$–$T_5$, $T_7$ so that those control signals are applied to the respective circuit elements which they control at a time slightly after they are developed.

The sequence counter 111 generates a sequence of output signals which constitute address signals for the read only memory 113. The read only stores the various control signals for operating the phase difference converter circuit, and it also stores jump address and jump address control signals. The sequence counter operates to generate a sequence of address signals which read out the control signals from the read only memory so as to operate the entire phase difference converter circuit to carry out the disclosed mode of operation.

The sequence counter also recieves from the read only memory an eight bit jump address signal over signal path 114 and a two bit jump address control signal over signal path 115. When the jump address control signal is "0,0", the sequence counter counts sequentially through the entire sequence of read only memory address signals. However, when the jump address control signal is either "0 1" or "1 0", and depending on the content of register 80, the count of the sequence counter will jump to a value out of sequence. When the jump address control signal is "0 1" the sequence counter will execute a jump on the condition that the sign of the content of register 80 is positive. When the jump address control signal is "10" the se- TABLE III-continued

| Sequence Counter Number | Operations | Remarks |
|---|---|---|
| | (U80)+(C)→U80, otherwise 0→U80 | |
| 83 | right shift U80,L80 by one bit | same as sequence 10 |
| 84~95 | repeat 82~83, total 7 times | same as sequence 11~22. |
| 96 | (U80)−(R30)→U80 | |
| 97 | (U80)→R30 if(U80)≧0,go to 108, otherwise go to next | $Y_1$ is obtained in R30. |
| 98 | (R90)→U80 | |
| 99 | (U80)−(C)→U80 if(U80)≧0, go to 110, otherwise go to next. | here, (C)=$A\psi_{1max}\sin(\alpha+\beta)/\sin\beta$ |
| 100 | (R30)→U80 | (R30)=$Y_1$ |
| 101 | (U80)+(C)→U80 if (U80)≧0, go to 116, otherwise go to next. | here (C)=$B\psi_{2max}\cos\alpha/\sin\beta$ |
| 102 | (R90)→U80 | (R90)=$X_1$ |
| 103 | (U80)−(C)→U80 | here(C)=$A\{\psi_{1max}\sin(\alpha+\beta)+\psi_{2max}\cos(\alpha+\beta)\}/\sin\beta$ |
| 104 | (U80)→R40 | (R40)=X |
| 105 | (R30)→U80 | (R30)=$Y_1$ |
| 106 | (U80)+(C)→U80 | here, (C)=$B(\psi_{1max}\sin\alpha+\psi_{2max}\cos\alpha)/\sin\beta$ |
| 107 | (U80)→R30 go to 122 | (R30)=Y |
| 108 | (R90)→U80 | |
| 109 | (U80)→R40 go to 122 | (R30)=Y=$Y_1$ (R40)=X=$X_1$ |
| 110 | (R30)→U80 | (R30)=$Y_1$ |
| 111 | (U80)+(C)→U80 | here, (C)=$B\psi_{1max}\sin\alpha/\sin\beta$ |
| 112 | (U80)→R30 | |
| 113 | (R90)→U80 | (R90)=$X_1$ |
| 114 | (U80)−(C)→U80 | here, (C)=$A\psi_{1max}\sin(\alpha+\beta)/\sin\beta$ |
| 115 | (U80)→R40 go to 122 | (R30)=Y (R40)=X |
| 116 | (R30)→U80 | (R30)=$Y_1$ |
| 117 | (U80)+(C)→U80 | here,C=$B\psi_{2max}\cos\alpha/\sin\beta$ |
| 118 | (U80)→R30 | (R30)=Y |
| 119 | (R90)→U80 | (R90)=$X_1$ |
| 120 | (U80)−(C)→U80 | here,C=$A\psi_{1max}\cos(\alpha+\beta)/\sin\beta$ |
| 121 | (U80)→R40 | (R40)=X |
| 122 | (C)→U80 | before this sequence, X is obtained in R40 and Y is obtained in R30 for each case. here,(C)=1/Y step |
| 123~129 | (U80)→L80 0→U80 | same sequence as 2~8 |
| 130 | if LSB of L80 is 1 (U80)+(R30)→U80, otherwise 0→U80 | similar operations as 9 |
| 131 | right shift U80, L80 by one bit | same as sequence 10 |
| 132~142 | repeat 130~141. 130 is repeated total 7 times, 131 is repeated total 6 times. After operation 142 has completed, and i LSB of U80 is 1, go to 145, otherwise to to next. | operations 130~142 correspond to (L80)X(R30)→U80. In other words, Y/Y step. Shift operations are made only 6 times (not 7 times), therefore LSB of U80 shows following relations: if LSB is 1, then Y/Y step−[Y]≧0.5; if LSB is 0, then Y/Y step <0.5. |
| 143 | (R30)→U80 and go to 146 | (R30)=Y |
| 144 | (R30)→U80 | (R30)=Y |
| 145 | (U80)+(C)→U80 | here C=Ystep |
| 146 | (U80)+(R40)→U80 | after operation (U80)= N Ystep +X |

The waveforms of the various control signals for operating the phase difference converter circuit, their relative timing, and their relation to the sequence number of the sequence of operations is illustrated in FIGS. 20A, 20B. Jumps are made in the sequence of operations depending upon whether the tests illustrated in the flow chart in FIG. 16 yield a "yes" or a "no" answer. For example, if (U80)≧0, (where U80 is the content of the upper one word of register 80, as described in Table III), a jump is made from operation 97 to operation 108.

The following Table IV correlates the sequence of signal processing steps shown in FIG. 16 with the sequence numbers of jumps shown in FIGS. 20A and 20B and mentioned in Table III, above.

TABLE IV

| Signal Processing Operation | Sequence No. |
|---|---|
| input to $Y_1 \geq 0$ | 97 |
| $Y_1 \geq 0$ (YES) | 108 |
| $Y_1 < 0$ (NO.) | 98,99 |
| $X_1 \geq A\Psi_{1max} \frac{\sin(\alpha+\beta)}{\sin\beta}$ (YES) | 110 |
| $X_1 \geq A\Psi_{1max} \frac{\sin(\alpha+\beta)}{\sin\beta}$ (NO) | 100,101 |
| $Y_1 \geq -B\Psi_{2max} \frac{\cos\alpha}{\sin\beta}$ (YES) | 116 |
| $Y_1 \geq -B\Psi_{2max} \frac{\cos\alpha}{\sin\beta}$ (NO) | 102 |
| input to $\frac{Y}{Y_{step}} - [Y] \geq 0.5$ | 142 |
| $Y/y_{step} - [Y] \geq 0.5$ (YES) | 145 |
| $Y/Y_{step} - [Y] \geq 0.5$ (NO) | 143 |
| input to Angle Seq. No. = $NY_{step} + X$ | 146 |

Details of the phase difference converter circuit shown as a block diagram in FIG. 18 are illustrated in FIGS. 21–29.

Figure 21:
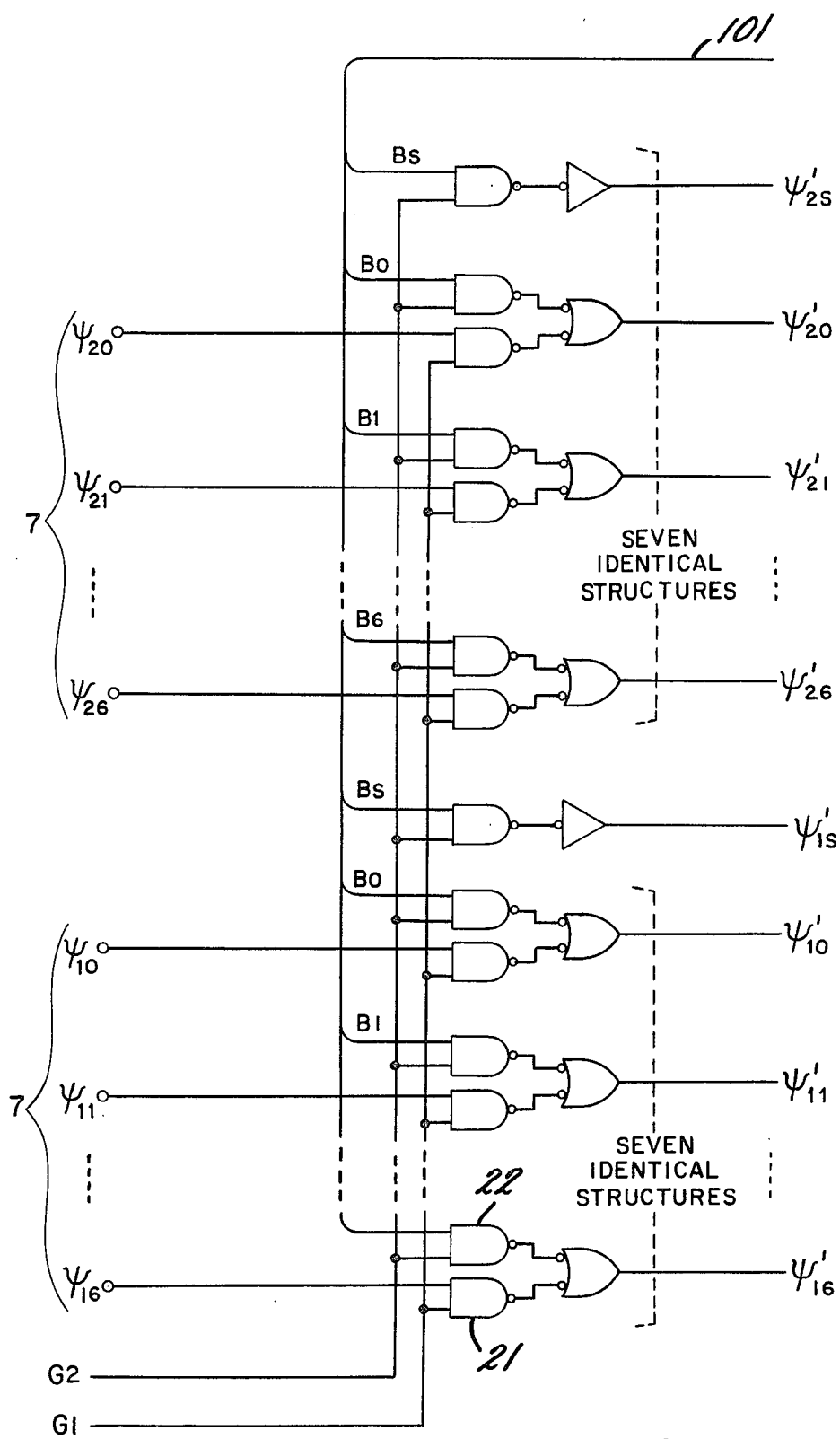
FIG. 21 is a schematic circuit diagram of a gate circuit in the phase difference converter illustrated in FIG. 18.

FIG. 21 illustrates the details of the gate circuit 20. The gate circuit includes pairs of NAND gates 21, 22 which respectively receive control signals G1 and G2. Each pair of NAND gates receives a corresponding bit signals of a phase difference signal Ψ and the output signal B of the register circuit 80. When the control signal G1 is applied the gate circuit is enabled to pass the phase difference signals Ψ, and when the control signal G2 is applied the gate circuit is enabled to pass the adder circuit output signal B.

Figure 22:
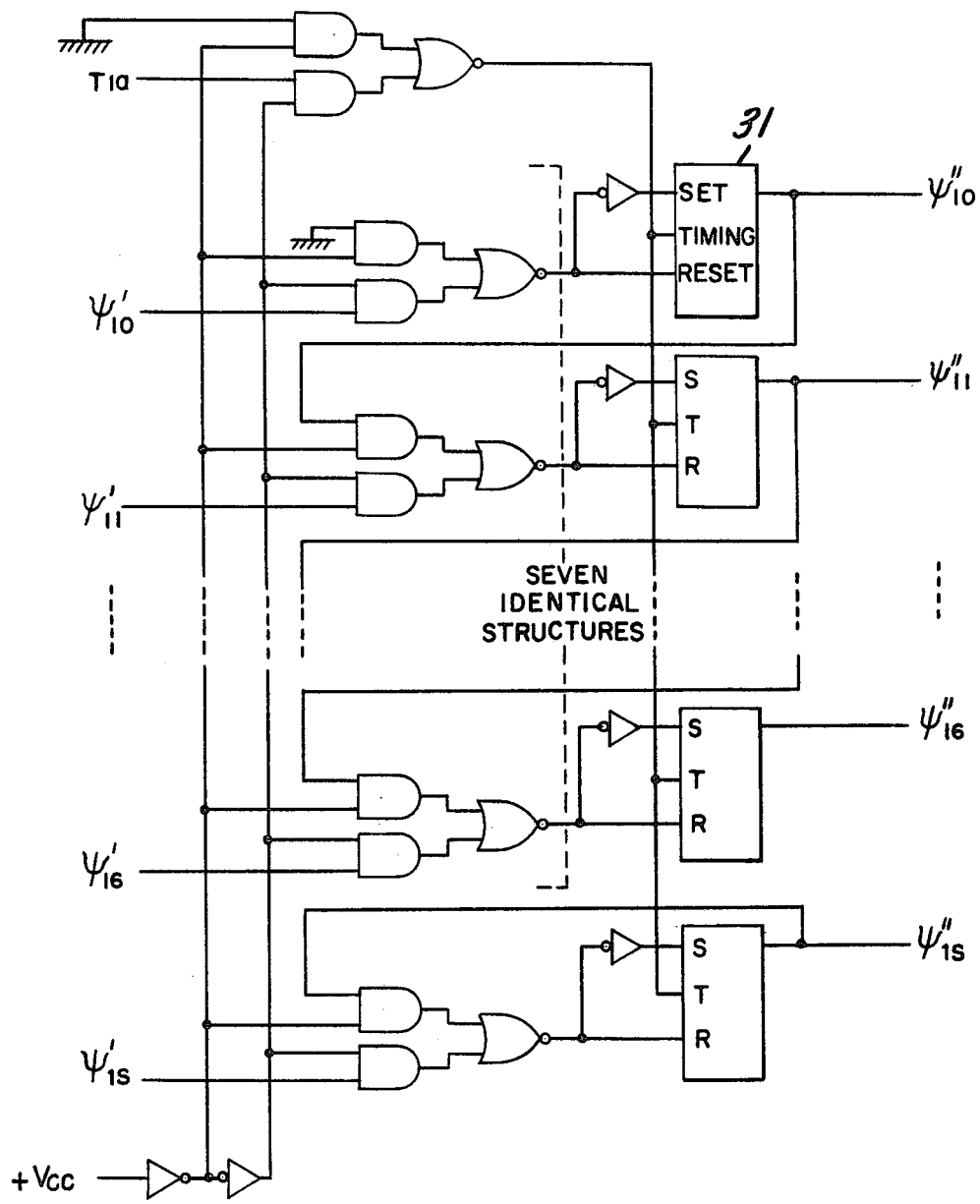
FIG. 22 is a schematic circuit diagram of a register circuit in the phase difference converter illustrated in FIG. 18.

FIG. 22 illustrates the circuit of register 30. Since registers 30 and 40 have identical circuits, only the circuit of register 30 is illustrated. The register is comprised of eight flip-flop circuits 31; seven of the flip-flops correspond to the seven bit signals of $\Psi_{10}'$–$\Psi_{16}'$ of the phase difference signal $\Psi_1'$, received from the gate circuit 20 and the eighth flip-flop corresponds to the sign bit signal $\Psi_{1s}'$ of the phase difference signal $\Psi_1'$. When the control signal $T_{1a}$ is applied to the register circuit 30 the input signal to the register circuit is applied to set the states of the flip-flops so that the flip-flop output signals $\Psi_{10}''$–$\Psi_{1s}''$ are the same as the bit signals comprising the input signal. In this way the register circuit stores the input signal.

Figure 23:
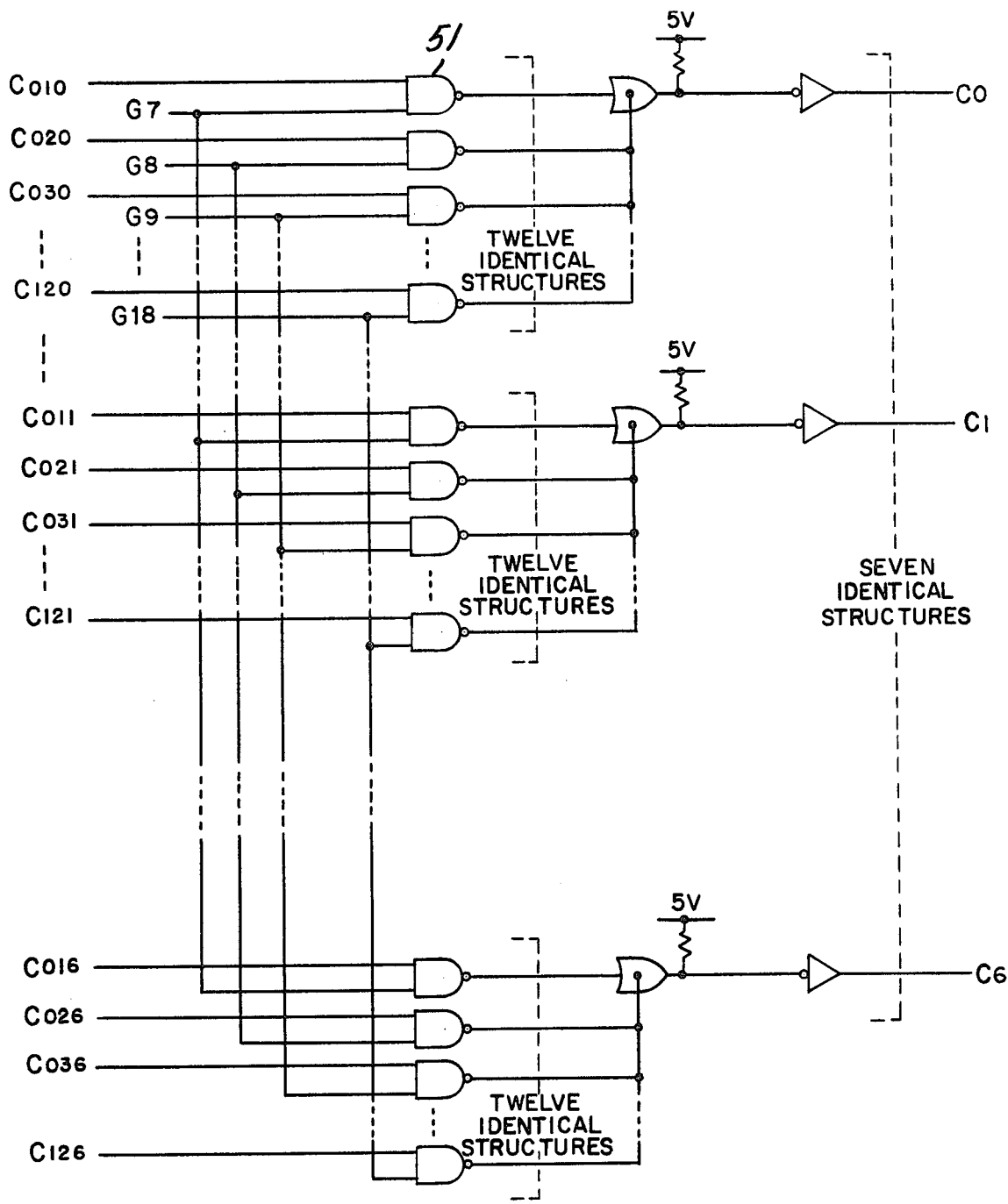
FIG. 23 is a schematic circuit diagram of a memory circuit in the phase difference converter illustrated in FIG. 18.

FIG. 23 illustrates the detailed circuitry of the memory circuit 50. The memory circuit includes a plurality of groups of twelve NAND gates 51. Each group of twelve NAND gates corresponds to one bit of the memory signal, and in the disclosed preferred embodiment there are seven groups of twelve NAND gates each corresponding to one of the seven bits of the memory output signal. One NAND gate is each of the seven groups of NAND gates receives a corresponding one of the control signals G7–G18. When a particular control quence counter will execute a jump on the condition that the least significant bit of the content of register 80 is "1". And when the jump address control signal is "11" the sequence counter will execute an unconditional jump. The jumps in the operating sequence are indicated in FIG. 20. The sequence counter 111 also receives a pair of bit signals over signal path 116 indicating the sign of the content of register 80, and the status of the least significant bit of the content of register 80, respectively.

The control signal G19 applied to the adder 60 and switching circuit 70 is dependent on the value of the lower least significant bit of the register 80. Therefore, in FIG. 20 the signal G19 is shown as sometimes having both high and low values simultaneously. At such a time, whether control signal G19 is high or low will depend on the value of the lower least significant bit of the register 80.

FIG. 29 illustrates the details of the sequence counter. The sequence counter includes a plurality of edge triggered D-type flip-flops 120 which receive the clock signal T$\Phi_2$. The flip-flops comprise a counter circuit that counts through the operating sequence in response to successive pulses of the clock signal T$\Phi_2$. In the absence of jump signals from the read only memory 113 the count developed by the flip-flop will proceed uninterrupted through the entire operating sequence. The sequence counter further includes an array of logic gates which receive jump signals and which apply signals to the D-inputs of the flip-flop circuits for altering the sequence of the count values developed by the flip-flop circuits according to the jump signals.

Sequence counters are also commercially available. One suitable example is the AM2909/2911 micro program sequencer manufactured by Advanced Micro Devices, Inc., Sunnyvale, Calif. These devices are described in the manufacturer's publication entitled "The AM2900 Family Data Book with Related Support Circuits", at pages 2–74 to 2–87 thereof.

From the foregoing description of the phase difference converter circuit its advantages are readily apparent. No large capacity memory is required; only a few constant value signals need be memorized. The circuit is simple, and it remains simple even when high resolution measurements are made. And since the circuit is a digital binary circuit and does not require a large capacity memory, it may be made entirely from high speed logic elements for maximum operating speed if this is necessary.

What we claim is:

1. In a radio angle measurement apparatus the combination comprising:

(a) an antenna array comprising a plurality of radiator elements spaced with an inter-element spacing d which is considerably larger than one-half of the propagation wavelength $\lambda$ of a radio-frequency electromagnetic signal incident on said antenna array, said antenna array exhibiting at least two different values of d/$\lambda$, said antenna array responding to the incident radio-frequency electromagnetic signal by developing respective electrical signals at said radiator elements, and the electrical signals developed at said respective radiator elements having mutually different relative phase values therebetween each of which varies as the incident angle of the received radio-frequency signal varies;

(b) digital phase difference measuring means for measuring the phase differences between the electrical signals developed by said radiator elements for at least two different values of d/$\lambda$ and for developing digital output signals representative of the measured values of phase difference; and (c) phase difference to incident angle converter means responsive to the digital output signals from said digital phase difference measuring means for generating an output signal representative of the incident angle of the radio-frequency electromagnetic signal relative to said antenna array and which varies monotonically as the incident angle varies, said phase difference to incident angle converter means comprising a binary adder circuit responsive to control signals for performing addition, subtraction and multiplication operations on binary signals applied to said binary adder circuit and for developing a binary output signal having a binary value equal to the result of the operation performed by said binary adder circuit;

storage means responsive to control signals for temporarily storing in binary signal format the output signals from said digital phase difference measuring means and for temporarily storing in binary signal format the binary output signals from said binary adder circuit;

addressable memory means responsive to control signals for storing and for reading out the following numerical constants in binary signal format, $C_1 = A \sin(\alpha+\beta)/\sin \beta$ $C_2 = A \cos(\alpha+\beta)/\sin \beta$ $C_3 = A\Psi_{1max}\sin(\alpha+\beta)/\sin \beta$ $C_4 = A\Psi_{1max}\cos(\alpha+\beta)/\sin \beta$ $C_5 = B \sin \alpha/\sin \beta$ $C_6 = B \cos \alpha/\sin \beta$ $C_7 = B\Psi_{1max}\sin \alpha/\sin \beta$ $C_8 = B\Psi_{2max}\cos \alpha/\sin \beta$ $C_9 = (A/\sin \beta)\{\Psi_{1max}\sin(\alpha+\beta)+\Psi_{2max}\cos(\alpha+\beta)\}$ $C_{10} = (B/\sin \beta)(\Psi_{1max}\sin \alpha + \Psi_{2max}\cos \alpha)$ $C_{11} = 0.5$ $C_{12} = Y_{step}$ selecting means responsive to control signals for selecting among the temporarily stored output signals from said digital phase difference measuring means, the output signal of said binary adder circuit and the output of said addressable memory means to permit addition, subtraction and multiplication operations to be performed on the selected signals; and control means for applying control signals to said storage means, said binary adder circuit, said selection means and said addressable memory circuit to operate said selection means and to operate said binary adder circuit to perform addition, subtraction and multiplication operations on the selected signals according to the following equations:

(i) transforming the digital output signals of said digital phase difference measuring means having values $\Psi_1, \Psi_2$ into signals having values $X_1, Y_1$ and temporarily storing the signals having values $X_1, Y_1$ in said storage means, wherein $$X_1 = C_1\Psi_1 - C_2\Psi_2$$

$$Y_1 = -C_5\Psi_1 + C_6\Psi_2$$

(ii) if $Y_1 \geq 0$, performing the signal processing of (vi),
(iii) if $Y_1 < 0$, transforming the signals having values $X_1, Y_1$ into signals having values X, Y and temporarily storing the signals having values X, Y in said storage means, wherein $$X = X_1 - C_3$$

$$Y = Y_1 + C_7$$

(iv) if $X_1 < C_3$ and $Y_1 \geq -C_8$, transforming the signals having values $X_1, Y_1$ into signals having values X, Y and temporarily storing the signals having values X, Y in said storage means, wherein $$X = X_1 - C_4$$

$$Y = Y_1 + C_8$$

(v) if $Y_1 < C_8$, transforming the signals having values $X_1, Y_1$ into signals having values X, Y and temporarily storing the signals having values X, Y in said storage means, wherein $$X = X_1 - C_9$$

$$Y = Y_1 + C_{10}$$

(vi) subtracting [Y] Ystep from Y, wherein [Y] is the integer value of Y, and if $Y - [Y]Ystep \geq 0.5$ Ystep setting $Y = [Y] + 1$, and if $Y - [Y]Ystep < 0.5$ Ystep setting $Y = [Y]$; and
(vii) adding $Y + X$.

2. In a radio angle measurement apparatus the combination according to claim 1, wherein said storage means is comprised of:
a first controllable register circuit for storing and for reading out binary signals applied thereto, and said first controllable register circuit connected for applying the content thereof to said selecting means;
a gate circuit responsive to control signals and having an input receptive of input signals for applying the gate input signals to said first register circuit under control of the control signals to temporarily store the gate input signals in said first register circuit;
a second controllable register circuit receptive of control signals for storing and for reading out binary signals applied thereto, and said second controllable register circuit connected for receiving the output of said adder circuit for temporarily storing the output of said adder circuit under control of the control signals;
a third controllable register circuit receptive of control signals for storing and for reading out binary input signals applied thereto, and said third controllable register circuit connected for applying the content thereof to said selecting means; and
means defining a circuit path from the output of said second register circuit to the input of said adder circuit, the input of said third register circuit and the input of said gate circuit for permitting the output signal of said adder circuit temporarily stored in said second register circuit to be read out and applied directly to said adder circuit, temporarily stored in said third register circuit and applied to said gate circuit for subsequent temporary storage in said first register circuit under control of control signals.

3. In a radio angle measurement apparatus the combination according to claim 2, wherein said gate circuit is comprised of:
a first plurality of NAND gates each connected to receive a respective bit signal of the binary output signals from said digital phase difference measuring means;
a second plurality of NAND gates each connected to receive a respective bit signal of the binary output signal from said binary adder circuit;
means for applying a control signal to enable said first plurality of NAND gates to pass the binary output signals from said digital phase difference measuring means; and
means for applying a control signal to enable said second plurality of NAND gates to pass the binary output signals from said binary adder circuit.

4. In a radio angle measurement apparatus the combination according to claim 2, wherein said first controllable register circuit is comprised of:
a plurality of flip-flop circuits each corresponding to a respective bit signal of the binary output signals of said gate circuit; and
means responsive to control signals and receptive of the gate circuit binary output signals for setting the respective flip-flop circuits to states determined by the bit signals comprising said gate circuit binary output signals, wherein output signals of said flip-flops representing the states of said flip-flops together comprise the binary output signals of said first register circuit.

5. In a radio angle measurement apparatus the combination according to claim 2, wherein said memory circuit is comprised of:
a plurality of groups of twelve NAND gates, wherein each group of twelve NAND gates corresponds to one bit of the binary output signal of said memory circuit, and each NAND gate within a given group of twelve NAND gates corresponds to one bit of one of the twelve values of numerical constants stored in said memory circuit,
a plurality of OR gates, each OR gate corresponding to a respective group of twelve NAND gates and being connected to receive output signals from all of the twelve NAND gates within its corresponding group of NAND gates;
means for applying a respective control signal corresponding to a particular constant stored in said memory to the NAND gate in each group of twelve NAND gates that correspond to the particular constant for reading out the value of the particular constant, whereby said OR gates develop output signals which together comprise the output of said memory circuit.

6. In a radio angle measurement apparatus the combination according to claim 2, wherein said switching circuit is comprised of:
- a plurality of groups of four NAND gates, wherein each group of four NAND gates corresponds to one bit of the binary signal selected by said switching circuit, and each NAND gate within a given group of four NAND gates receives one bit of the binary signals to be selected by said switching circuit;
- a plurality of OR circuits each corresponds to one group of four NAND gates and connected for receiving the outputs of its corresponding group of NAND gates;
- means responsive to control signals and receptive of the output signals of said plurality of OR gates for developing output signals identical to or the logical compliment of the output signals of said plurality of OR gates in response to the control signals; and
- means for applying control signals to each NAND gate that corresponds to a particular input signal to be selected
- for enabling the corresponding NAND gates to develop output signals which together comprise the signal to be selected.

7. In a radio angle measurement apparatus the combination according to claim 2, wherein said control means is comprised of:
- clock signal generating means for generating a periodic two-phase clock signal;
- a read only memory responsive to address signals for storing the control signals and for reading out the control signals in response to address signals applied thereto;
- a sequence counter circuit responsive to one phase of the clock signal for developing a sequence of memory address and for applying the sequence of memory address signals to said read only memory for reading out a sequence of control signals effective to operate said phase difference-to-incident angle converter; and
- a plurality of AND gates, each of said AND gates receiving the second phase of the two phase clock singal, and each of said AND gates receiving a respective control signal from said read only memory, said AND gates developing as output signals respective control signals developed in synchronism with the second phase of the two phase clock signal.

8. A radio angle measurement apparatus according to claim 1, wherein said control means is effective for: selecting coefficients A and B such that $$A = \frac{\sin \beta \, R^m}{\Psi_{1max} \sin (\alpha + \beta) - \Psi_{2max} \cos (\alpha + \beta)}$$

$$B = \frac{\sin \beta \, R^n}{\Psi_{1max} \sin \alpha - \Psi_{2max} \cos \alpha},$$

where $\Psi_{1max}$ and $\Psi_{2max}$ are the maximum possible values of $\Psi_1$ and $\Psi_2$, R is a desired cardinal number, m is a positive integer, n is zero or a positive integer, $\alpha = -\mathrm{Tan}^{-1}\{(d/\lambda)_2/(d/\lambda)_1\}$, and $\beta$ is the angle between the X and Y axes.

* * * * *